(12) United States Patent  
Van Gerwen

(10) Patent No.: US 12,551,055 B2  
(45) Date of Patent: Feb. 17, 2026

(54) FLOATING PARTICLES REMOVAL WITHIN A FOOD FRYER

(71) Applicant: GEA FOOD SOLUTIONS BAKEL B.V., Bakel (NL)

(72) Inventor: Hendrikus Petrus Gerardus Van Gerwen, Someren (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 818 days.

(21) Appl. No.: 17/440,946

(22) PCT Filed: Mar. 25, 2020

(86) PCT No.: PCT/EP2020/058322  
§ 371 (c)(1),  
(2) Date: Sep. 20, 2021

(87) PCT Pub. No.: WO2020/193615  
PCT Pub. Date: Oct. 1, 2020

(65) Prior Publication Data  
US 2022/0218150 A1    Jul. 14, 2022

(30) Foreign Application Priority Data  
Mar. 26, 2019 (EP) .................................. 19165227

(51) Int. Cl.  
*A47J 37/12* (2006.01)

(52) U.S. Cl.  
CPC ....... *A47J 37/1223* (2013.01); *A47J 37/1214* (2013.01); *A47J 37/1276* (2013.01)

(58) Field of Classification Search  
CPC .......................... A47J 37/1214; A47J 37/1223  
See application file for complete search history.

(56) References Cited

U.S. PATENT DOCUMENTS

| | | |
|---|---|---|
| 3,203,341 A | 8/1965 | Hedgepeth |
| 3,757,672 A | 9/1973 | Szabrak et al. |

(Continued)

FOREIGN PATENT DOCUMENTS

| | | |
|---|---|---|
| JP | 2000-237063 A | 9/2000 |
| JP | 2002-223954 A | 8/2002 |

(Continued)

OTHER PUBLICATIONS

Gea Food—Easy Fry. Video Demonstration [online]. GEA Food, 2015 [retrieved on Jun. 18, 2025]. Retrieved from the internet: <URL: https://video.gea.com/gea-food-easy-fry>. (Year: 2015).*

(Continued)

*Primary Examiner* — Elizabeth M Kerr  
(74) *Attorney, Agent, or Firm* — The Dobrusin Law Firm, P.C.

(57) ABSTRACT

A fryer with a vessel, that contains a hot fluid-bath with a fluid level, and which includes one or more belts which transport products to be fried through the hot fluid-bath; a submerge belt that hinders the products from floating to the fluid level, and a floating particles removing device. A surface of the belts on which the products are located during transportation in the fryer has a submerged section being submerged in the hot fluid-bath. The submerge belt has a submerged section being submerged in the hot fluid-bath. The floating particle removing device is located vertically above the submerged section of the submerge belt and/or of the submerge section of the surface of the belts.

20 Claims, 17 Drawing Sheets

(56) References Cited

U.S. PATENT DOCUMENTS

| | | | |
|---|---|---|---|
| 3,885,056 A * | 5/1975 | Smith | A47J 37/1214 |
| | | | 426/441 |
| 4,081,375 A | 3/1978 | Deal et al. | |
| 4,372,200 A | 2/1983 | Caridis et al. | |
| 4,623,544 A * | 11/1986 | Highnote | A47J 37/1233 |
| | | | 426/523 |
| 4,744,293 A | 5/1988 | Shimokawa | |
| 4,852,475 A | 8/1989 | Yang | |
| 5,074,199 A | 12/1991 | Miller | |
| 5,253,567 A | 10/1993 | Gunawardena | |
| 8,464,635 B1 * | 6/2013 | Sprinkle | A47J 37/1214 |
| | | | 99/405 |
| 2001/0029846 A1 | 10/2001 | Nothum, Sr. et al. | |
| 2005/0238770 A1 * | 10/2005 | Van Der Doe | A47J 27/0817 |
| | | | 426/438 |
| 2009/0047400 A1 | 2/2009 | Basker et al. | |
| 2012/0318753 A1 * | 12/2012 | Forrester | A47J 37/1223 |
| | | | 210/406 |
| 2014/0356496 A1 * | 12/2014 | Melnyczuk | A23B 7/0205 |
| | | | 426/523 |
| 2020/0060475 A1 * | 2/2020 | Hohler | A47J 37/1228 |

FOREIGN PATENT DOCUMENTS

| | | |
|---|---|---|
| WO | 98/00034 A2 | 1/1998 |
| WO | 2018/112152 A1 | 6/2018 |

OTHER PUBLICATIONS

International Search Report and Written Opinion, dated Jun. 22, 2020, for International Application PCT/EP2020/058322.

International Preliminary Report on Patentability, dated May 20, 2021, for International Application PCT/EP2020/058322.

European Search Report dated Feb. 26, 2024, for corresponding European Divisional patent application No. 24157265.0.

Opposition procedure of equivalent European patent EP3945964, dated Oct. 4, 2023.

Opposition against copending European patent EP4144266, dated Feb. 5, 2025.

CFS Industrial Food Systems; GEA EasyFry XL Brochure Jun. 27, 2017.

CFS Industrial Food Systems; GEA EasyFry Brochure Jun. 27, 2017.

GEA Food—Easy Fry—GEA Videos https://video.gea.com/gea-food-easy-fry May 11, 2015.

* cited by examiner

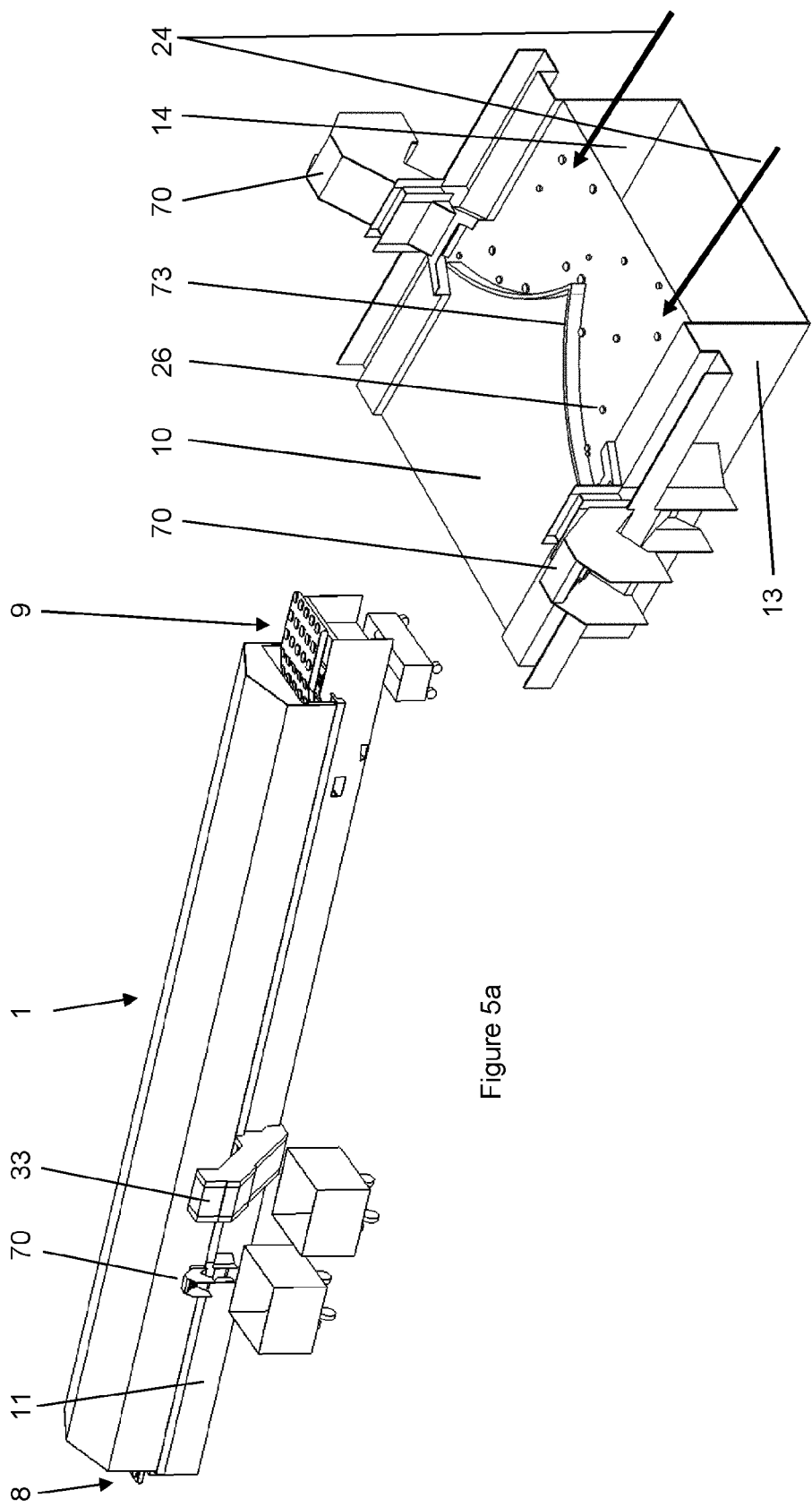

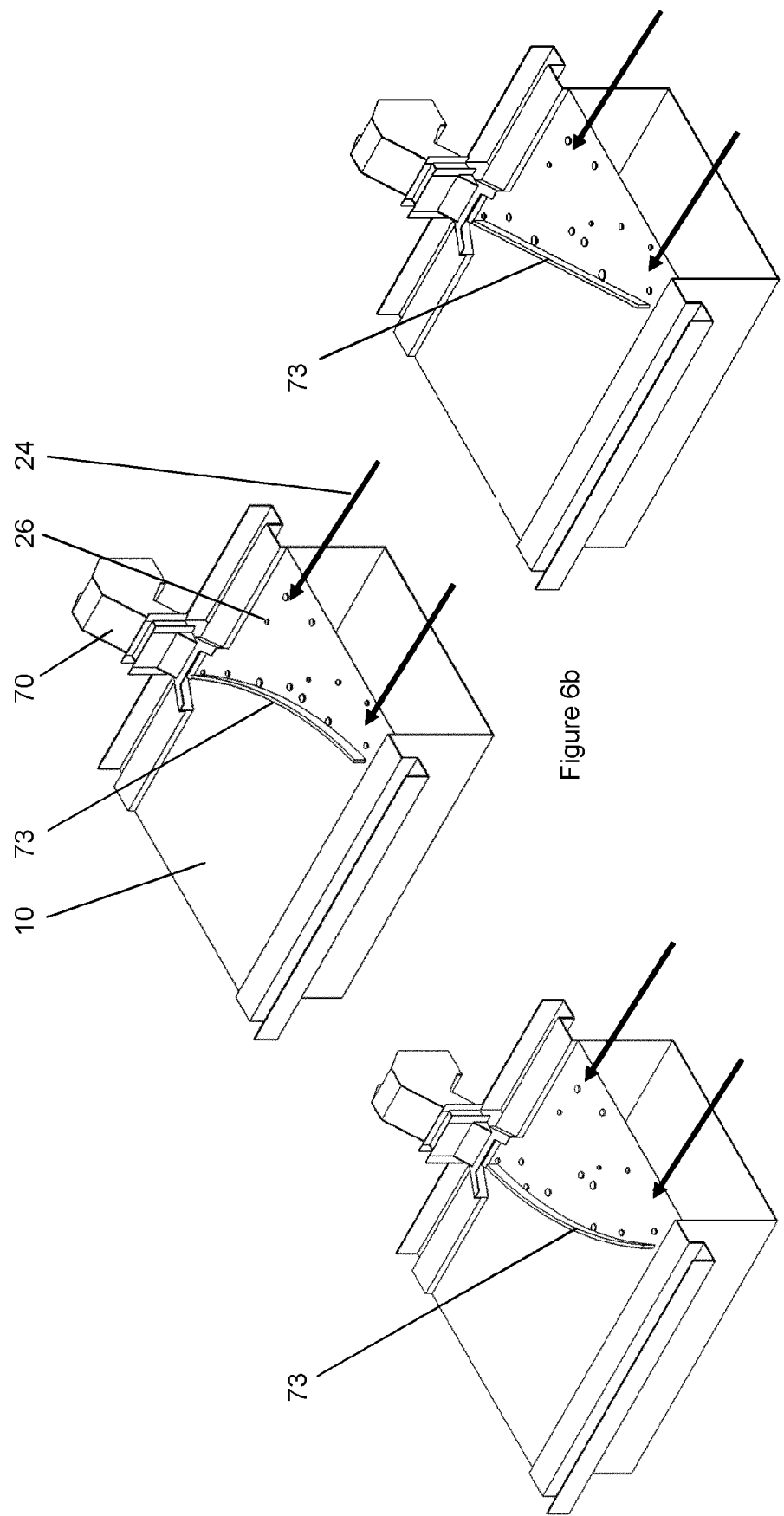

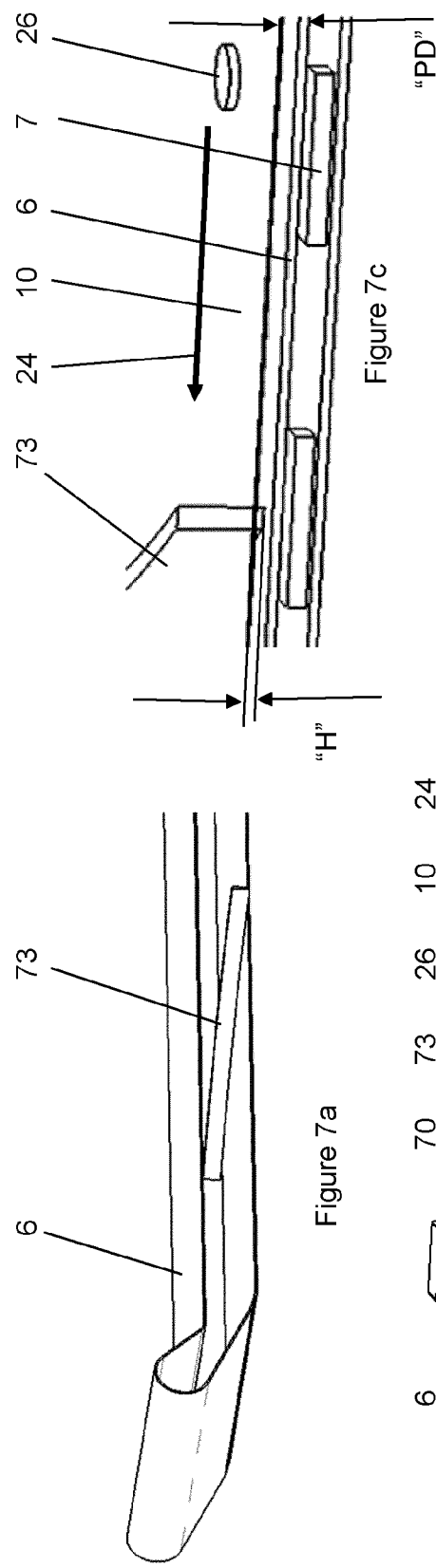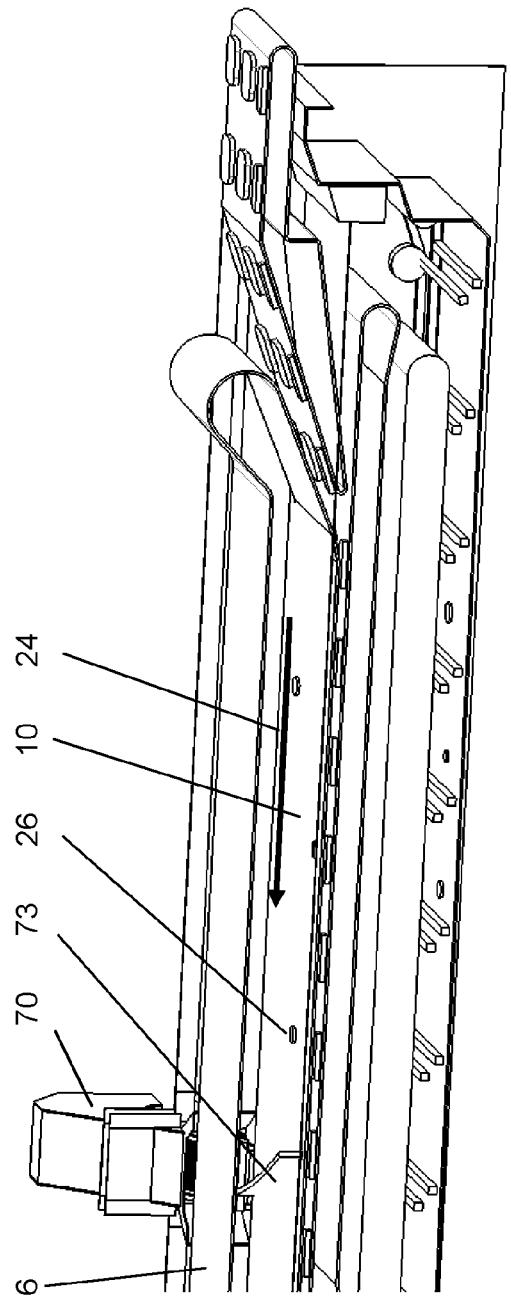
Figure 7a
Figure 7b
Figure 7c

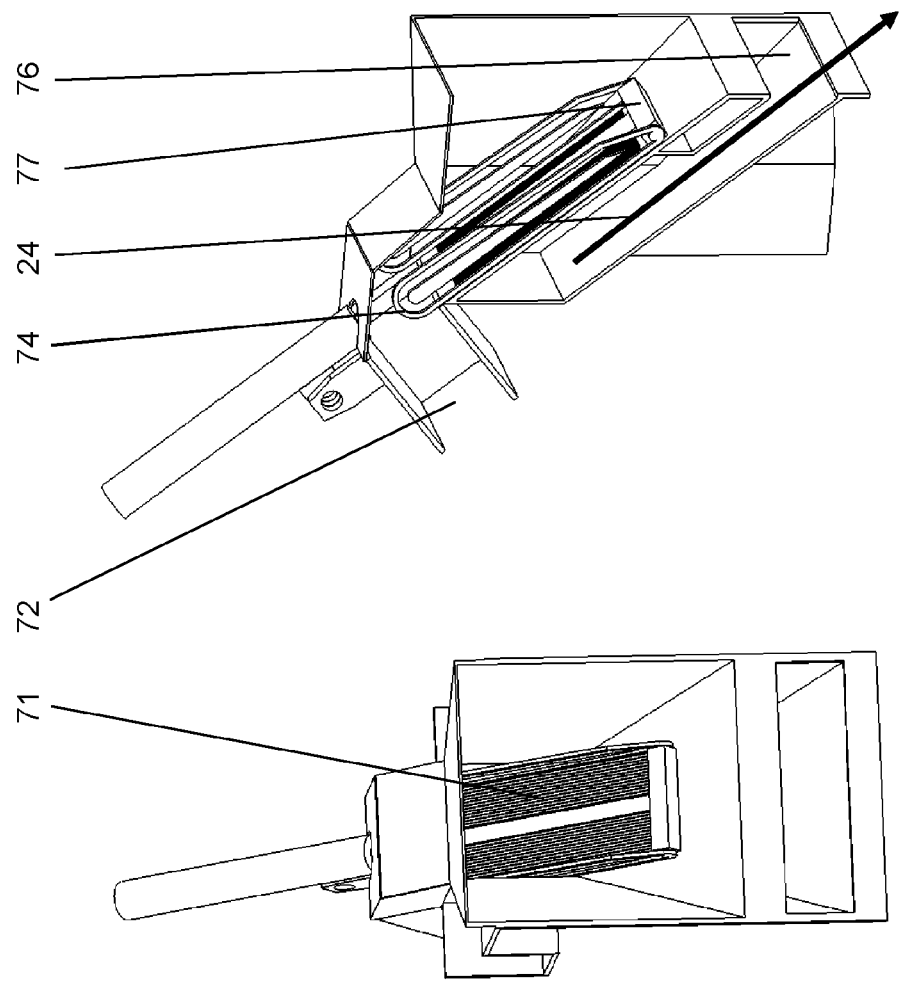
Figure 10c
Figure 10b
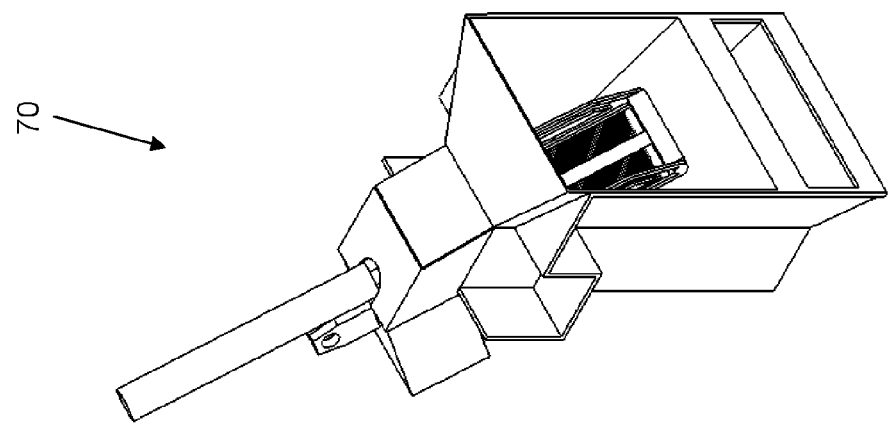
Figure 10a

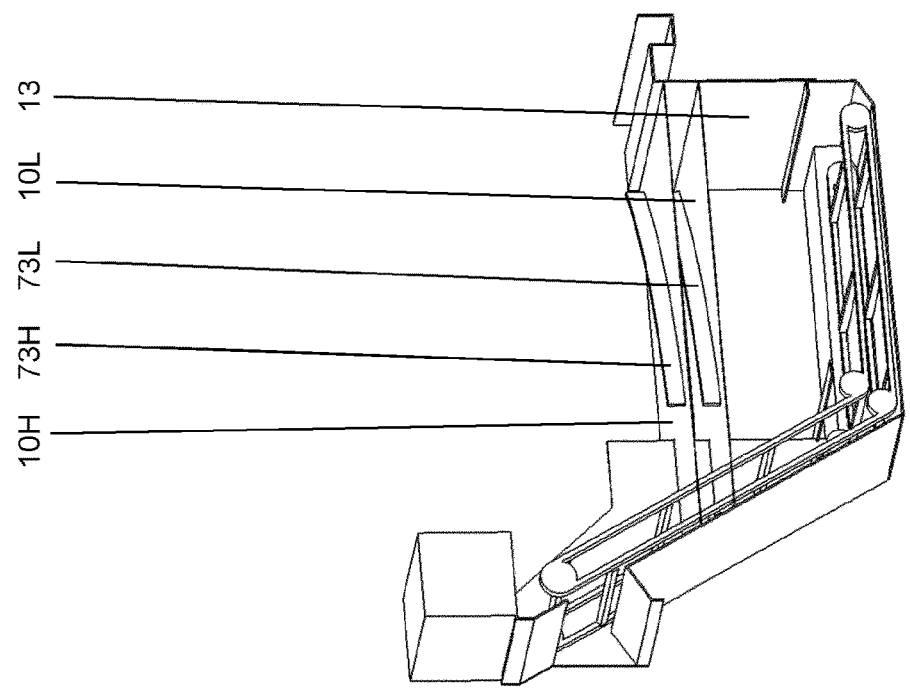
Figure 12c
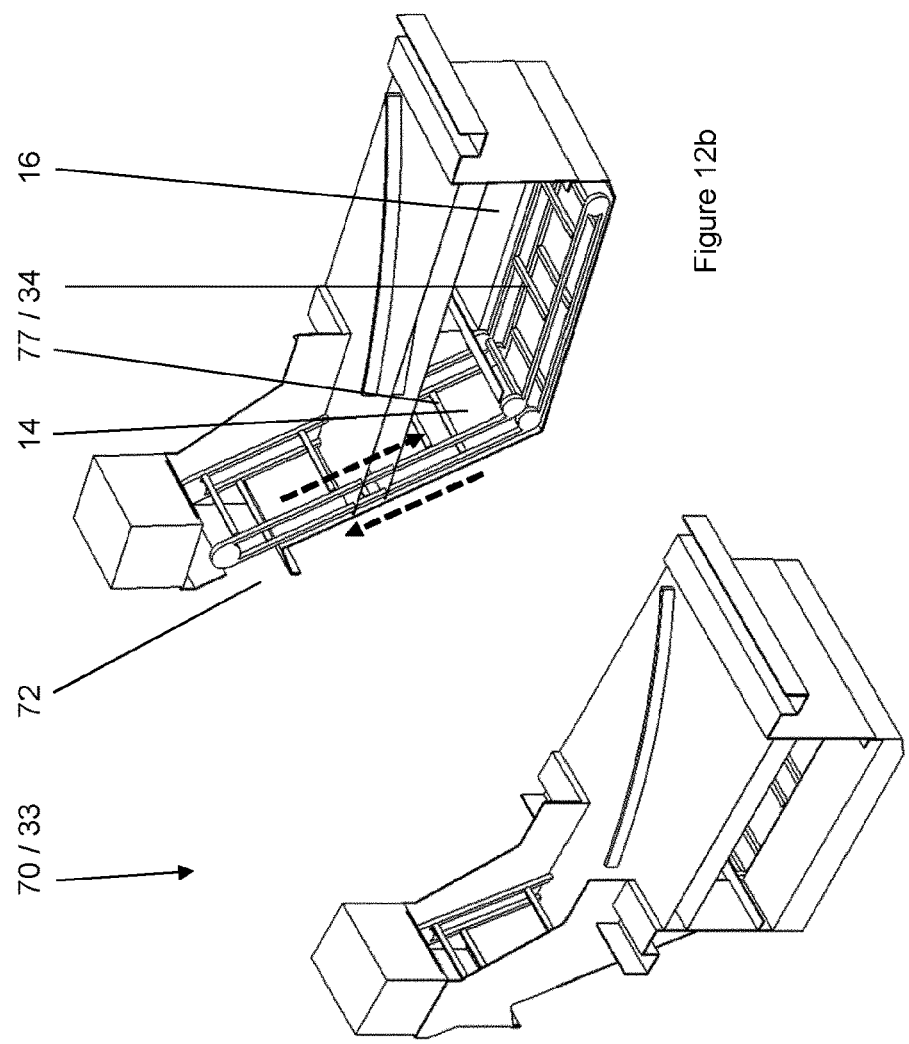
Figure 12b
Figure 12a

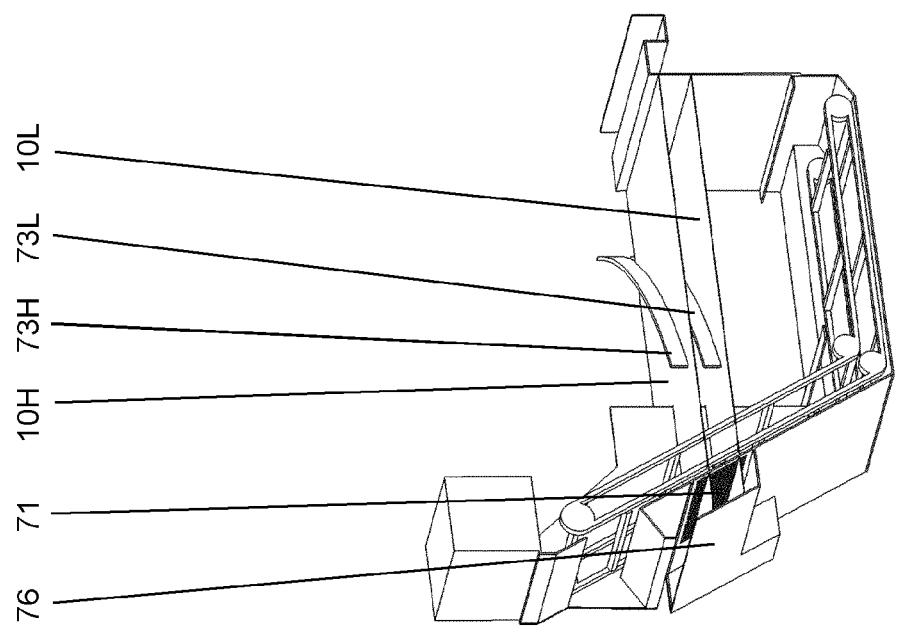
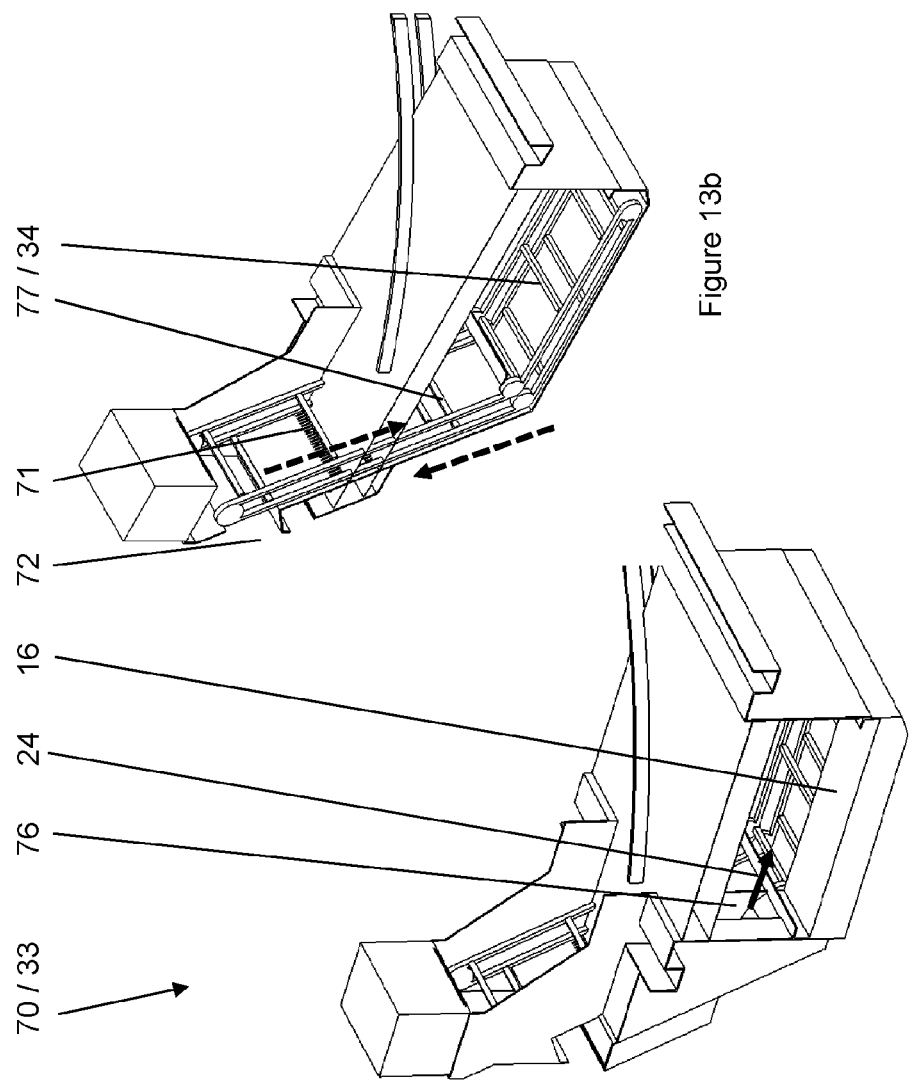

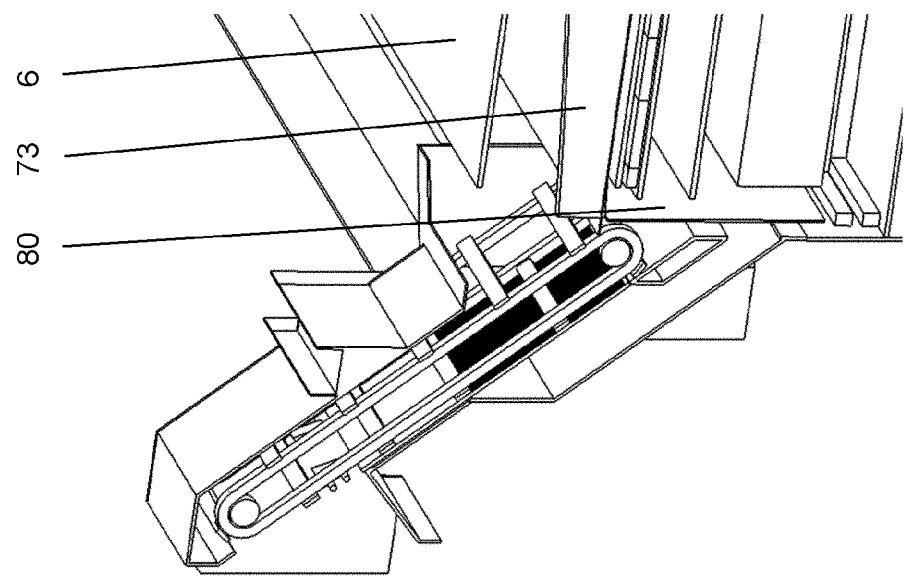
Figure 14e
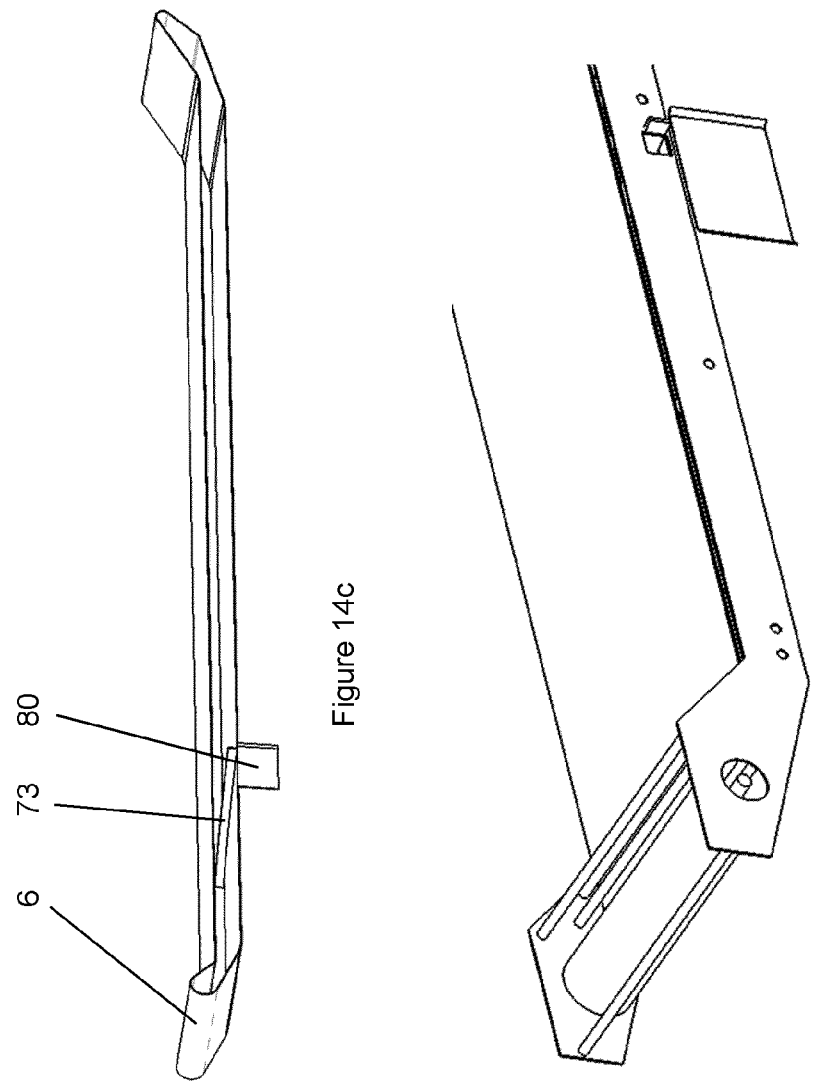
Figure 14c
Figure 14d

FLOATING PARTICLES REMOVAL WITHIN A FOOD FRYER

PRIORITY

This application is a US National Stage Entry under 35 U.S.C. § 371 of PCT Application Number PCT/EP2020/058322 filed on Mar. 25, 2020, which claims the benefit of EP 19165227.0 filed on Mar. 26, 2019, all of which are hereby incorporated by reference herein for all purposes.

FIELD

These teachings relate to the removal of particles and specifically floating particles within a continuous operating food fryer in which food and/or feed products such as meat, vegetarian food, cheese, vegetable products or a combination thereof will be shallow fried, par-fried or deep fried. Frying takes place in a hot fluid-bath within a vessel with a preferred hot fluid temperature in the range of 180-190° C. The products to be fried are transported through the hot fluid-bath from a product-entry side to a product-exit side by conveying means.

BACKGROUND

When coated products, for instance tempura coated products such as chicken nuggets and batter/breaded food products such as fried chicken or fish, enter the fryer the applied coating is still fragile. At the moment the food products enter the hot fluid-bath they will be subjected to mechanical and/or fluid-dynamical impact and the coating can be damaged or can even be removed from the food product resulting in separated particles such as bread crumbs, tempura, food particles, fines and other solid particles entering the hot fluid-bath. After a relatively short frying time the coating is set and the food product will be less vulnerable with regard to loss of particles. The separated products partially deposit at the bottom of the fryer or float to the top of the hot fluid-bath. The separated particles have to be removed as fast and as completely as possible. Particularly the removal of the floating particles was a problem in the past.

SUMMARY

There is therefore a need to provide a fryer that does not comprise the deficiencies of the fryers according to the state in the art. Particularly, it is the aim to prevent that floating particles adhere at the walls of the conveyor frames, prevent that floating particles will adhere at conveyor belts, prevent that floating particles will accumulate at fried food products and prevent/postpone degradation of the hot fluid.

The problem is solved with a fryer with a vessel, that contains a hot fluid-bath with a fluid level and which comprises:
  one or more transportation means which transports products to be fried through the hot fluid-bath, wherein a surface of the transportation means on which the products are located during transportation in the fryer has a submerged section being submerged in the hot fluid-bath,
  and optionally a submerge conveyor that hinders the products from floating to the fluid level, wherein the submerge conveyor has a submerged section being submerged in the hot fluid-bath
  a floating particles removing device wherein the floating particle removing device is located vertically above the submerged section of the submerge conveyor and/or the submerge section of the surface of the transportation means.

The present invention relates to a fryer for food products in a hot fluid-bath. The hot fluid may be oil, water or broth or the like. The hot fluid-bath is provided in a vessel and transportation means such as an endless belt, preferably a belt that is permeable for the hot fluid and/or particles which are removed from the product, transport the products through the bath. Preferably, the endless belt is a mesh belt. This transportation belt may comprise a multitude of segments, preferably separate segments, preferably each with a separate drive and/or with a combined drive for a multitude of segments. At least the surface of the transportation means, on which the products to be fried are located, is partially submerged into the hot fluid-bath and comprises an entry region, in which the transportation means enter the hot fluid-bath and an exit region in which the transportation means exit the hot fluid-bath.

Optionally, a submerge conveyor that hinders the products from floating to the fluid level is provided. This submerge conveyor also has a submerged section being submerged in the hot fluid-bath. The submerge conveyor is preferably also a belt, preferably an endless belt which is permeable for the hot fluid and/or particles which are removed from the product. Preferably, the endless belt is a mesh belt. Preferably, the submerge means can be adapted to the height of the product, preferably moved vertically up and down.

Additionally, the fryer comprises a floating particle removing device. According to the present invention, this device is located above the submerged section of the submerge conveyor and/or the submerge section of the surface of the transportation means. Due to this location of the floating particle removing device, the floating particles are removed at a very early stage and need not cross pass any transportation- or submerge-means once they have floated to the top of the hot fluid-bath, preferably to the hot fluid level.

According to a preferred or another inventive embodiment of the present invention, the fryer comprises an entry region, in which the submerge conveyor and/or the surface of the transportation means enters into the hot fluid-bath and an exit region in which the submerge conveyor and/or the surface of the transportation means exits the hot fluid-bath, wherein the floating particle removing device is located between the entry- and the exit-region.

Due to this location of the floating particle removing device, the floating particles are removed at a very early stage and need not cross pass any transportation- or submerge-means once they have floated to the top of the hot fluid-bath, the fluid level, preferably to the hot fluid level.

Preferably, the vessel comprises longitudinal side walls, wherein the floating particles removing device is located adjacent to at least one of these side walls. The longitudinal side walls preferably extend parallel to the direction of motion of the food products. The floating particles removing device can be provided in a recess in the side wall of the vessel. The floating particles removing device can extend through the longitudinal side wall, from the outside to the inside of the vessel.

The vessel is preferably made of stainless steel. The vessel may comprise a heat insulation.

According to a preferred embodiment of the present invention, the floating particle removing device comprises guiding means which guide the floating particles to the floating particles removing device. These guiding means are preferably located in the vicinity of the level of the hot fluid-bath, preferably partially submerged into the hot fluid-bath. Preferably, the guiding means extend at least partially, preferably entirely over the width of the vessel of the fryer. The width of the fryer is its horizontal extension perpendicular to the direction motion of the transportation means. The floating particles preferably flow along the guiding means towards the floating particle removing means. More preferably, the guiding means have, at least locally a concave shape, a convex shape, are straight or a combination thereof. Preferably, the guiding means have a non-sticky surface, more preferably Teflon.

Preferably, the guiding means are part of, integrated in and/or connected to the submerge conveyor. This embodiment has the advantage that the submerge means and the guiding means can be moved jointly, for example in case the submerge means is adapted to the height of the food product to be fried. In case no submerge conveyor is provided the guiding means can be part of, integrated in and/or connected to a transit conveyor and/or a non-stick conveyor and/or a takeover conveyor.

Preferably, the fryer comprises a fluid level control means that controls the fluid level above the height of the submerged section of the submerge conveyor and/or the submerged surface of the transportation conveyor. Particularly, in case the vertical position of the submerge means is changed, specifically increased, it is advantageous to also change the level of the hot fluid-bath to assure that it extends above the submerge means.

According to a preferred embodiment of the present invention, the fryer, particularly the vessel comprises a water slot in the vessel. This water slot is preferably utilized to condense vapor in the vessel. The water slot preferably extends parallel to one or both longitudinal side wall(s). Preferably, this water slot is interrupted and/or detoured at the location of the floating particle removal device.

Preferably, the floating particles removing device comprises mechanical means to remove, preferably lift, floating particles from the fryer and/or the surface of the hot fluid, preferably an auger and/or a belt and/or a moving scraper bar and/or a reciprocating scraper bar. These mechanical means preferably remove, particularly lift the particles above the level of the hot fluid-bath. The movement of the scraper bars is preferably guided in a profile.

Preferably, particles that sink to the bottom of the vessel are removed as a sediment. Hence, the inventive fryer preferably comprises a sediment removal device, for example one or more scraper(s) that preferably scrape along the bottom of the vessel of the fryer. Preferably, this sediment removal device and floating particle removal device are combined and preferably located at one sidewall of fryer vessel. Preferably, the particles, after they have been collected are removed jointly from the vessel by a particle removing device.

Preferably, the floating particle removal device comprises filter means, that separate the hot fluid from the particles, and a hot fluid return channel that returns the hot fluid to the hot fluid-bath.

Preferably, the fryer comprises a weir to skim floating particles from the hot fluid-bath surface.

Preferably the fryer comprises floating particle displacing means to direct/move floating particles towards floating particle removal device. Those displacing means preferably agitate the hot fluid-bath, preferably the surface or the hot fluid-bath such that the particles are driven towards the floating particle removing device.

Vacuum means preferably withdraw floating particles from the hot fluid surface.

BRIEF DESCRIPTION OF THE FIGURES

The inventions are now explained according to the Figures. These explanations do not limit the scope of protection. These explanations apply to all embodiments of the present invention likewise.

FIGS. 5a, 5b, 6a, 6b, 6c, 7a, 7b, and 7c show the inventive fryer.

FIGS. 8, 9a, 9b, 9c, 9d, 9e, 10a, 10b, 10c, 11a, 11b, and 11c show different embodiments of the floating particle removing device.

FIGS. 12a, 12b, 12c, 13a, 13b, 13c, 14a, 14b, 14c, 14d, and 14e show the combined removal device.

DETAILED DESCRIPTION

Figure 1:
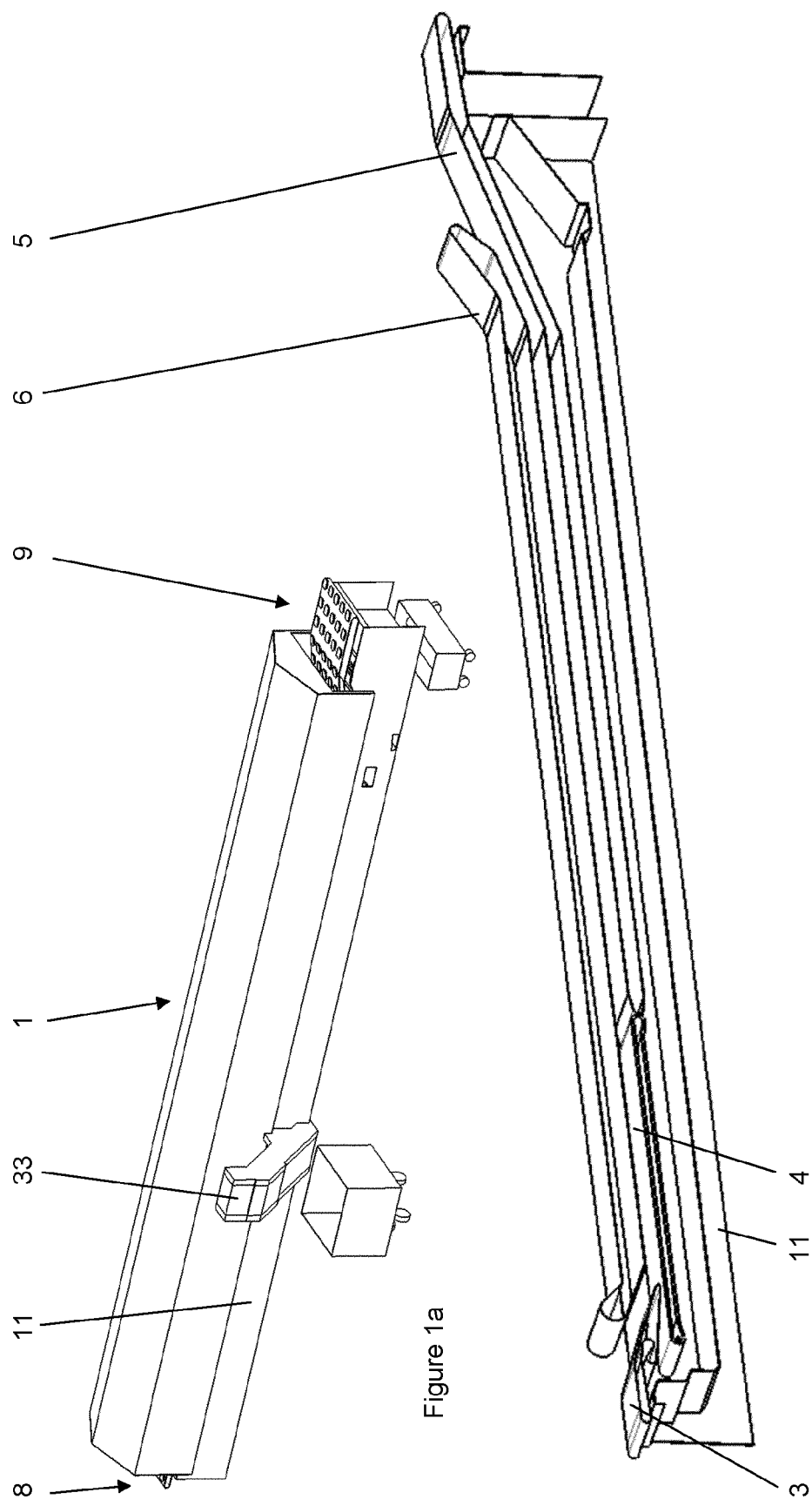
FIGS. 1a, 1b, 2, 3a, 3b, and 4 depict a fryer according to the state in the art.

FIG. 1a depicts a continuous food fryer 1 known from the state of the art. The vessel 11 comprises a hot fluid volume and a corresponding fluid level 10. Food and/or feed products enter the fryer at entry side 8 and exit the fryer at exit side 9. Depending on the length of the fryer and/or the amount of sediment to expect cross dirt/particle removal device 33 is provided.

There are numerous configurations of belt layouts possible, the configuration in FIG. 1b depicts an infeed conveyor 3, a non-stick conveyor 4 for processing coated and/or sticky products and a takeover conveyor 5. In case non-coated and/or non-sticky products will be fried a transit conveyor 2 can be applied instead of the combination of a non-stick conveyor 4 and a takeover conveyor 5. A submerge conveyor 6 can be applied to allow processing buoyant food products. Each conveyor can be provided as a mesh belt, preferably an endless mesh belt.

Figure 2:
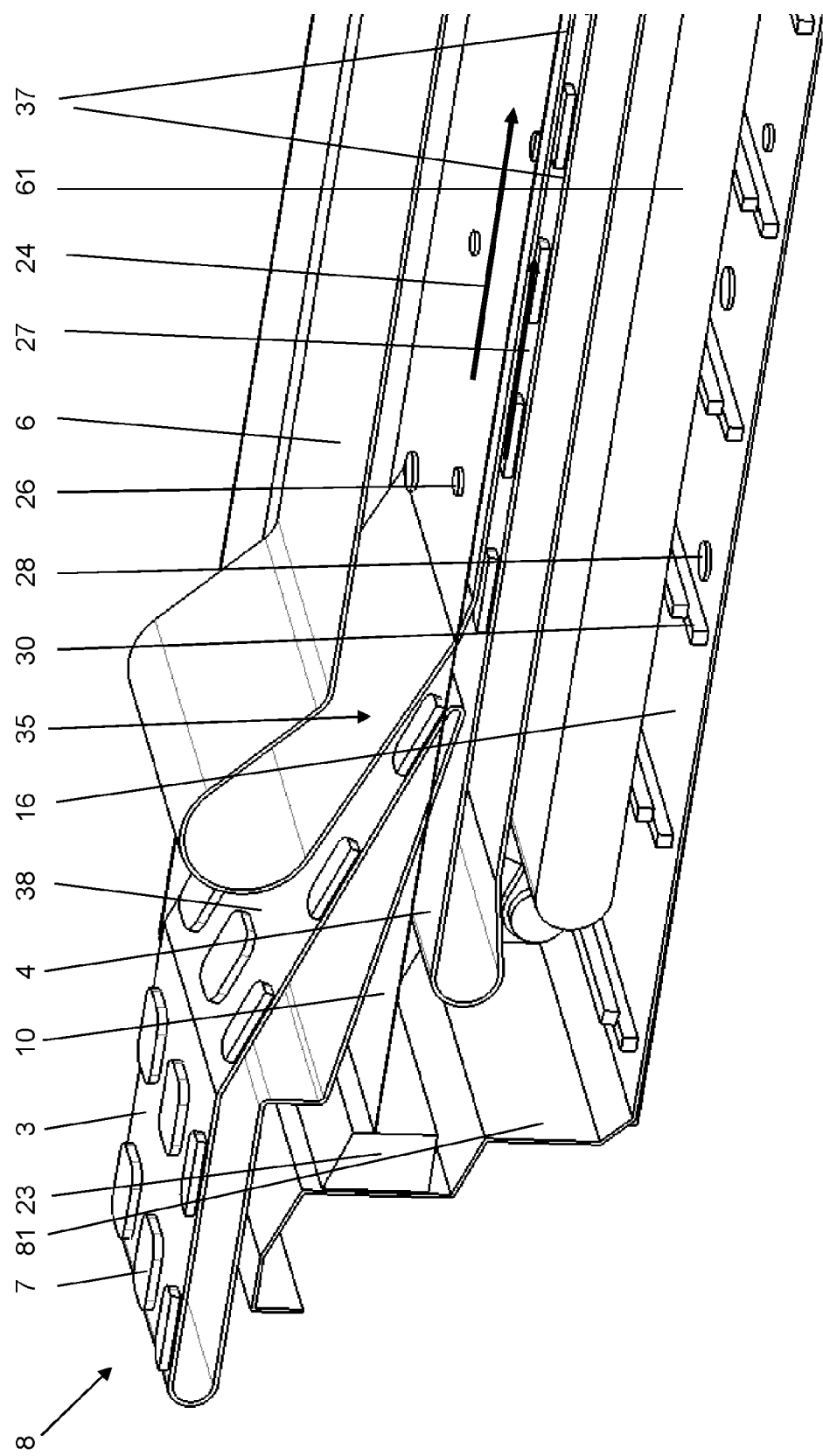

FIG. 2 depicts the state of the art wherein food and/or feed products 7 entering the hot fluid-bath 81 of the fryer via infeed conveyor 3 and will be transferred to non-stick conveyor 4. The optional submerge conveyor 6, preferably a mesh belt, more preferably an endless mesh belt, prevents the products from floating. Small separated particles 26 loosen from the coating and/or product will be in suspension. Heavier separated non-floating particles 28 will sink through and/or alongside the belts of the conveyors and preferably the heating element(s) of heat exchanger 61 towards bottom wall 16 of the fryer-vessel 11. A preferred built-in sediment removal system 30, for example a belt, a return part of transit conveyor 2/takeover conveyor 5 or in this embodiment a scraper belt, can be provided. The scraper can scrape the bottom wall of the fryer continuously, collect the food particles and transport them in the direction of sediment outlet 31.

Light particles 26 such as batter and/or breading will rise through the open mesh belt of submerge conveyor 6 and will float on the hot fluid surface and flow in the hot fluid flow direction 24 which hot fluid flow can be generated by flow distribution means 23.

Figure 3B:
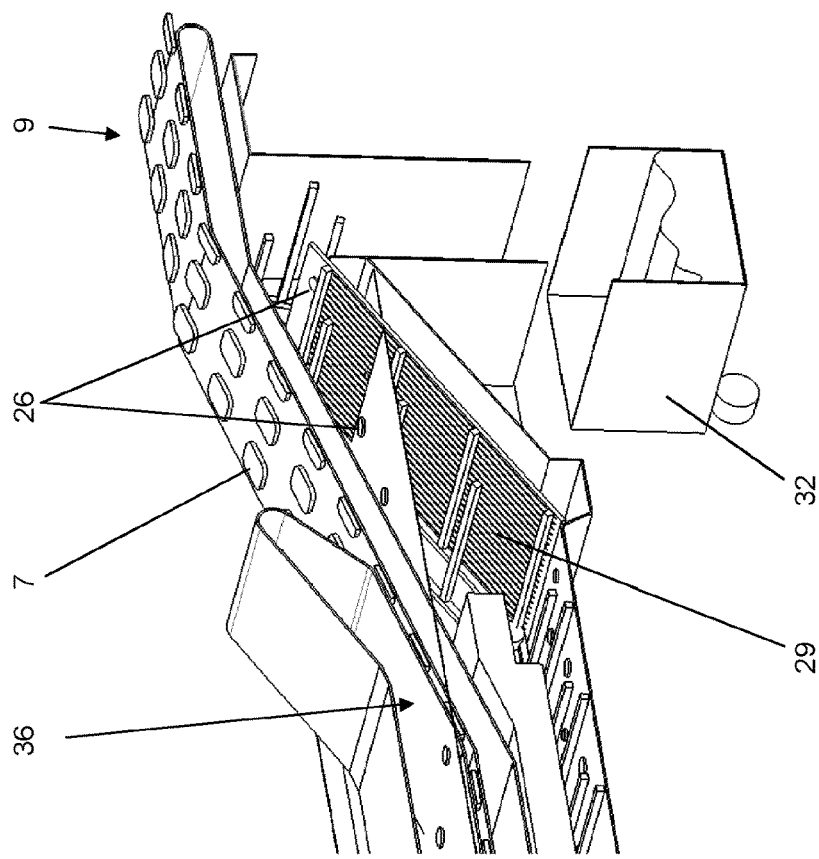
Figure 3A:
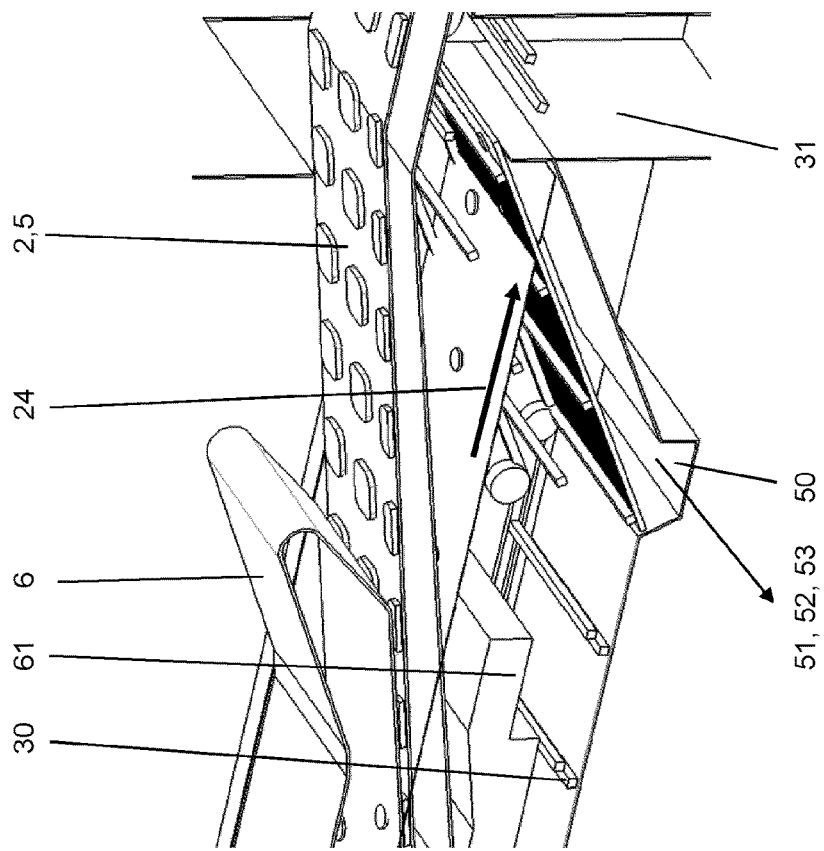

FIG. 3a and FIG. 3b depicts the state of the art wherein the scraper belt 30 carries the sediment over a built-in filter, here a slotted screen filter 29. The permeability can be in the range of 0.4-0.6 mm, larger particles will not enter the slots of the screen filter and will be transported in the direction of the sediment outlet 31 and to sediment collection means 32.

Floating particles 26 are transported to slotted screen filter 29 via hot fluid flow 24 and particles larger than the slots of the slotted screen filter will be discharged in sediment collection means 32. Hot fluid will be filtered via the slots in the slotted screen filter and flows towards hot fluid collection channel 50 and from thereon to hot fluid collection chamber 51 wherein positive pressure means 52 will pump the hot fluid via hot fluid transportation means 53 towards flow distribution means 23. The hot fluid can be additionally filtered via an external filter with a smaller permeability then the slotted screen filter 29 in order to remove the particles in suspension 27.

Figure 4:
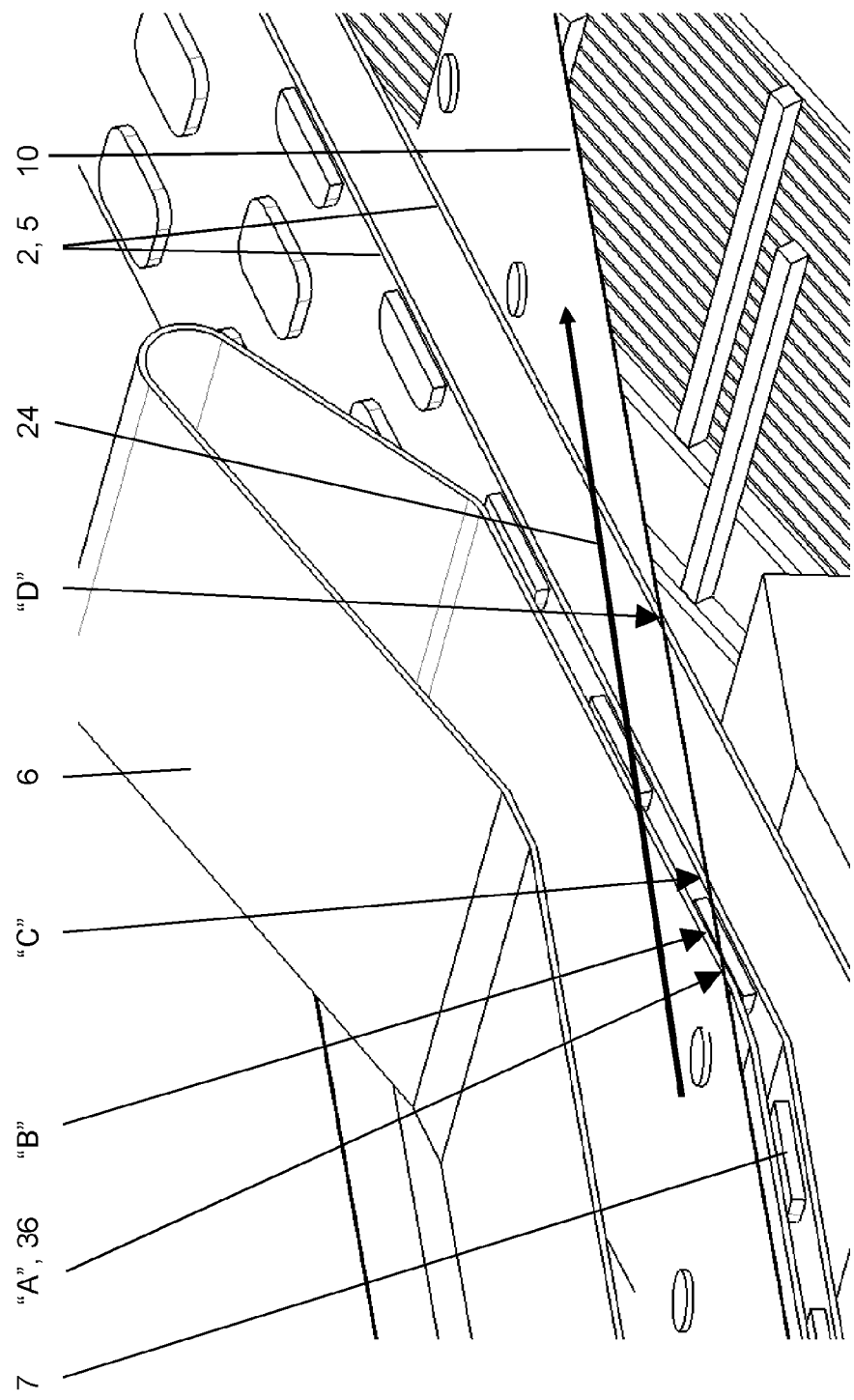

FIG. 4 depicts drawbacks in the state of the art. At the location where the fried food products exit the hot fluid-bath with fluid level 10 the floating particles first need to cross the moving open mesh belt of submerge conveyor 6 at location "A", have to pass the fried products at location "B", cross the moving open mesh belt of the transit/takeover conveyor 2, 5 at location "C" and cross the return part of the moving open mesh belt of the transit/takeover conveyor 2, 5 at location "D". Floating particles will adhere to the several belts and will be picked up by the passing food products.

Further, floating particles will tend to adhere and accumulate to the frame parts of the conveyors. An additional drawback of the state in the art is that floating particles will burn due to contact with the heated hot fluid and will result in degradation of hot fluid and amongst others these carbonized particles can be picked up by other food products.

In another known application in the field the floating particles will be removed by a floating particle removal device at the food product-exit side. Floating particles flow towards the product-exit side of the vessel and will be discharged out of the fryer by the belt of the transit and/or takeover conveyor. The fried food product will be discharged over a perforated chute while floating particles and hot fluid pass through the perforations of the chute onto a conveyor positioned outside the fryer and from thereon into a collection bin. The remaining hot fluid will be collected and transported towards an external filter system and consequently to the fryer.

The disclosure of FIGS. 1-4 also apply to the present invention except the floating particle removing device.

Contrary to the state in the art, it is the present inventive concept, that the floating particles at the surface of the hot fluid-bath are removed as soon as possible after breaking out/dislodging from the food product. Hence, the floating particle removal takes place vertically above the submerged section of the submerge conveyor and/or the submerge section of the surface of the transportation means. This is the area, where the floating particles are loosened from the product.

Additionally or alternatively, the fryer comprises an entry region, in which the submerge conveyor and/or the surface of the transportation means enters into the hot fluid-bath and an exit region in which the submerge conveyor and/or the surface of the transportation means exits the hot fluid-bath. The floating particle removing device is located between the entry- and the exit-region.

In an embodiment of the invention a floating particle removable device 70 is provided as depicted in FIG. 5a. The embodiment of FIG. 5b comprises two removal devices 70, one located at the left longitudinal side wall 13 of the vessel and one located at the right longitudinal side wall of the vessel 14. The floating particles are floating in the direction of hot fluid flow 24 and guiding means/splitter means 73 direct the floating particles 26 towards the floating particle removal device(s) 70. In this embodiment the guiding means are designed as a splitter which is advantageously in case the width of the fryer, which extends horizontally and perpendicular to the direction of flow 24, is relatively large. The guiding means are preferably made from or coated with a non-stick material such as Teflon to prevent particles stick to the guiding means, further the guiding means extend just below the hot fluid surface/fluid level 10, preferably in order to prevent swirling of hot fluid at the location/bottom side of the guiding means within the hot fluid-bath but still be able to skim the surface of the hot fluid and collect the floating particles. Preferably the guiding means will extend such that the means and consequently the particles will end up inside the floating particle removal device 70.

Guiding means 73 are not limited to one shape as depicted but can vary; FIG. 6a depicts a concave shape, FIG. 6b a convex shape and FIG. 6c a straight shaped guiding means. A combination of shapes can be advantageous to improve the flow of floating particles 26 towards floating particle removal device 70.

In order to be able to fry products with a different thickness the submerge conveyor is preferably able to be adjusted such that products with a different thickness are transported between submerge conveyor 6 and respectively non-stick conveyor 4, transit conveyor 2 and/or takeover conveyor 5. Fluid level 10 within fryer vessel 11 can also vary with the product thickness.

In a preferred embodiment depicted in FIG. 7a guiding means 73 are part of/integrated in/connected to the submerge conveyor 6. FIG. 7b and FIG. 7c depicts that this is advantageous in daily operation. In case the thickness of product 7 requires a change of the vertical position of the submerge conveyor 6, the guiding means 73 will automatically be adjusted to the new thickness and the correct fluid level 10 will be chosen such that the fluid level will preferably be provided at a predetermined distance "PD", preferably in the range of 10-30 mm, above the lower portion of the belt of the submerge conveyor 6, The preferred predetermined distance results in a controlled distance "H" of fluid level 10 to bottom side guiding means 73 independent from the thickness of product 7. No separate adjustment regarding the guiding means will be needed. The frame of submerge conveyor 6 and depending on the position of guiding means 73, preferably also the frame of the transit conveyor 2, the non-stick conveyor 4 and/or the takeover conveyor 5, can be provided with, preferably large, recesses in order to allow hot fluid to flow alongside the guiding means towards particle discharge removal 70, preferably without the floating particles touching the frame parts and/or without the floating particles adhering and/or accumulating against the frame parts of the conveyors. Additional frame support means and/or conveyor belt support means can be positioned such that floating particles will not touch, adhere and/or accumulate against the conveyor belt support means.

Figure 8:
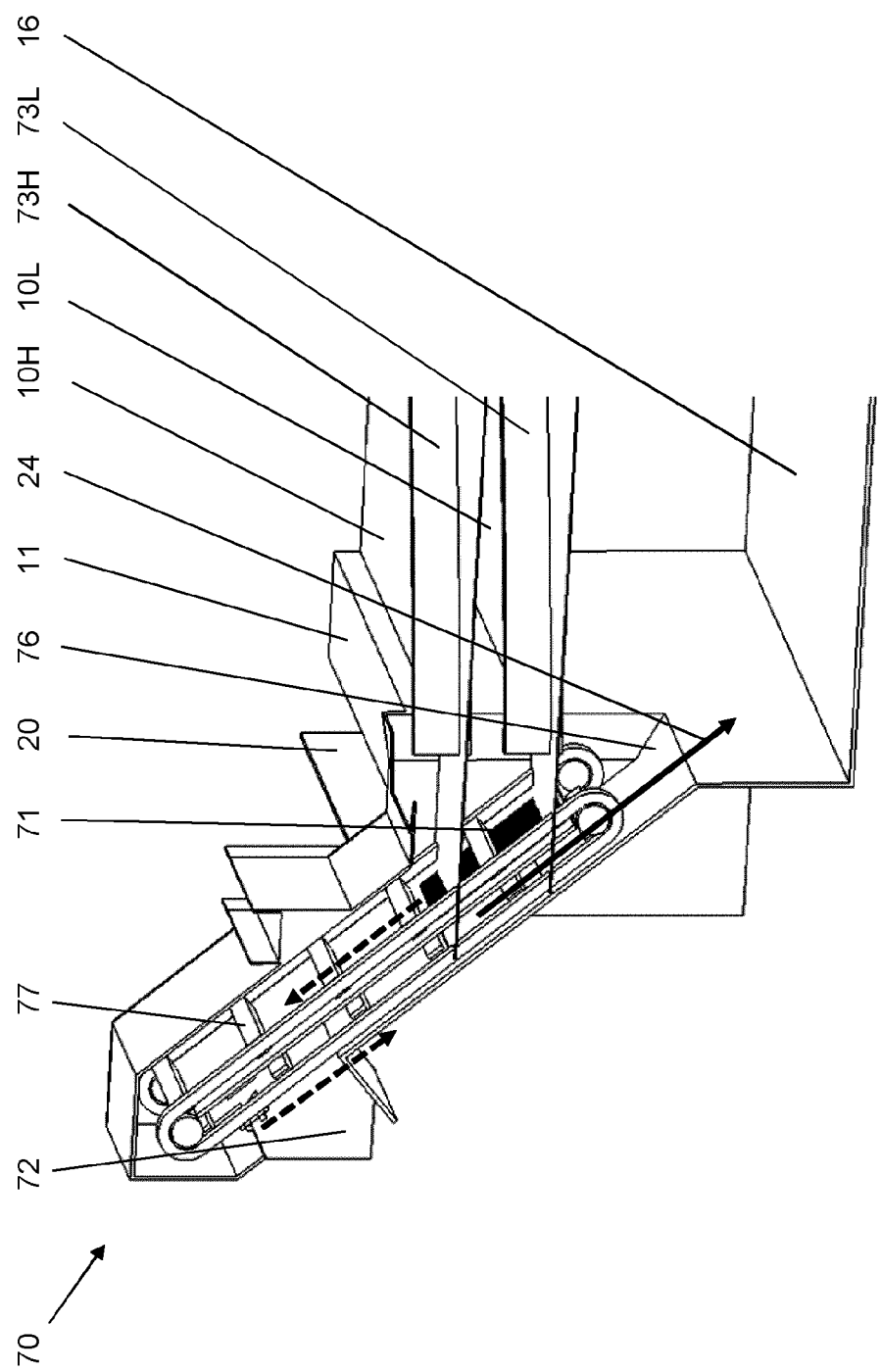

A cross section of floating particle removal device 70 is depicted in FIG. 8 which is designed to operate within a range of different fluid levels; low fluid level 10L and high fluid level 10H. The corresponding position of guiding means at low fluid level 73L and high fluid level 73H is depicted.

Fryers in the state of the art can be provided with water slot 20 to collect the water vapor which will condense due to the warm environment within the fryer. Further water slot 20 can be provided with a minimum amount of water to prevent the leakage of gases from the fryer to the ambient. However, to be able to direct in case of a high fluid level 10H the floating particles towards floating particle device 70, water slot 20 in fryer vessel 11 is preferably interrupted at the location of the floating particle device.

In the embodiment of FIG. 8 the floating particles are guided towards floating particle removal device 70 and specifically towards its removing means 77, in this embodiment a belt and more specifically a scraper belt. Here, the particles end up directly at filter means 71. The hot fluid and smaller particles will pass the filter means, in this embodiment slots of screen filter 71, and will flow back towards the fryer via hot fluid return channel 76 in the direction of hot fluid flow 24. Preferably the hot fluid flows back into the fryer close to bottom wall 16 of the vessel to prevent that slightly cooled hot fluid comes into contact with the food products. The larger particles can be removed by the moving (depicted by the dashed arrows) bars towards floating particle outlet 72. The return part of the scraper belt runs back underneath the screen filter, can turn and runs over the screen filter to collect the floating particles. For cleaning the design can be such that filter means 71 can be removed. Filter means 71 and hot fluid return channel 76 are optional.

Figure 9B:
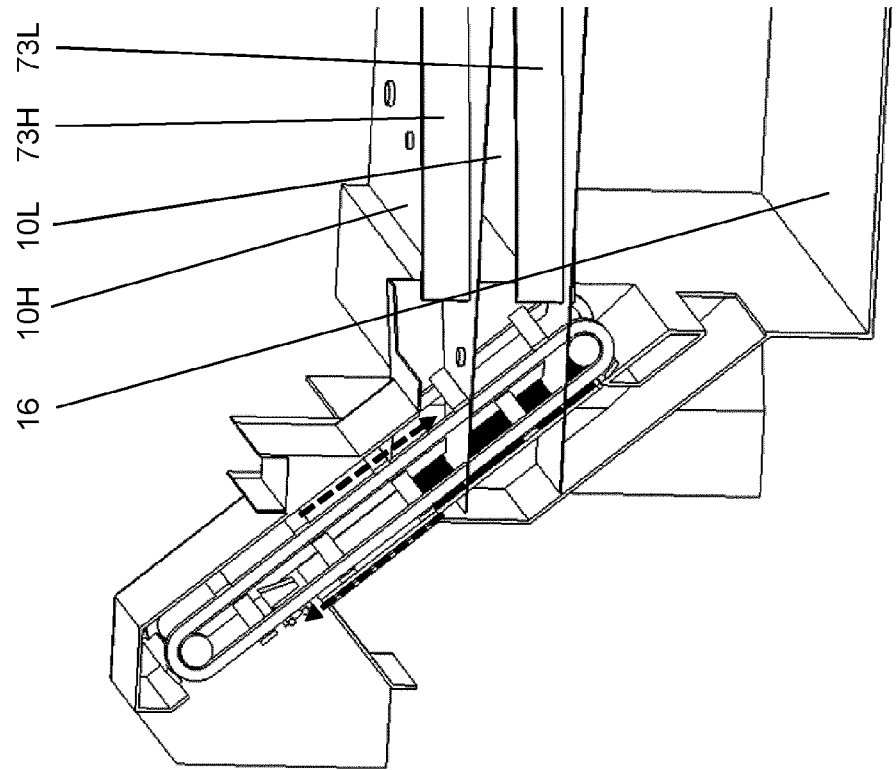
Figure 9A:
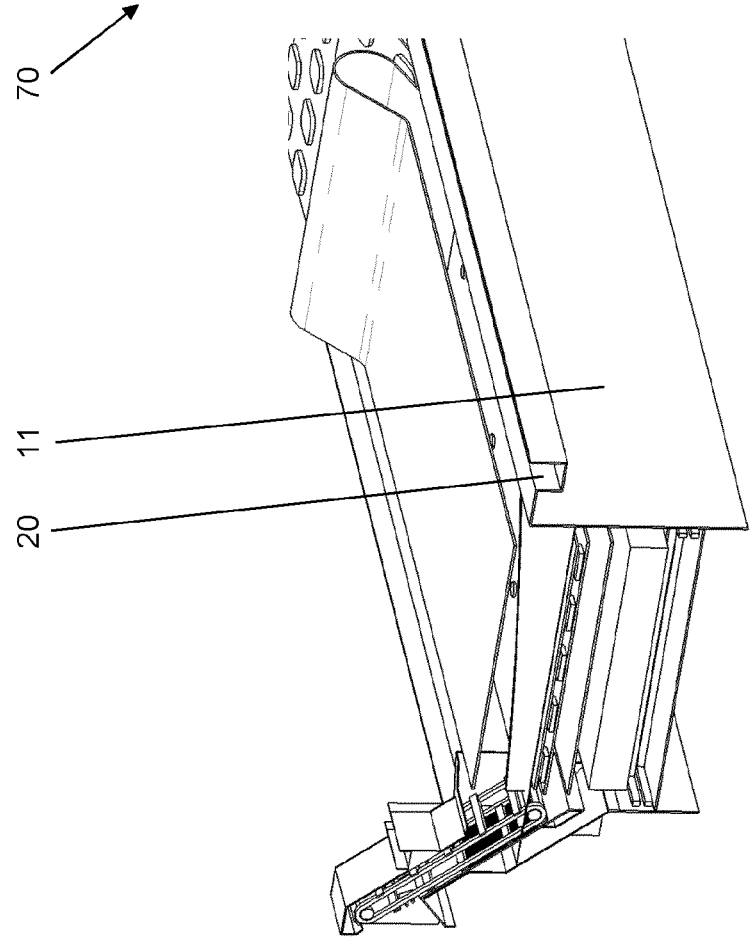
Figure 9E:
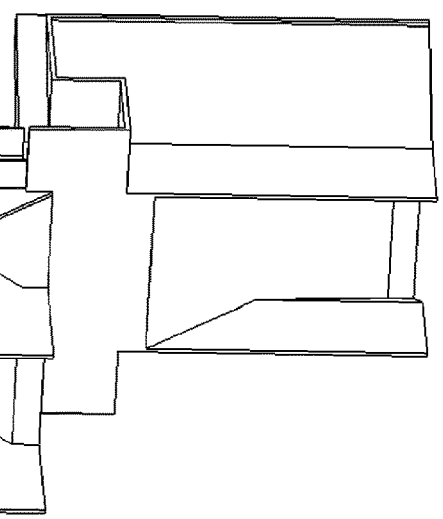

FIG. 9b depicts a cross section of another embodiment of floating particle removal device 70. This embodiment can be operated within a range of fluid levels 10L and 10H and therefore water slot 20 in fryer vessel 11 is preferably interrupted as depicted in FIG. 9a. Due to design-, manufacture- and stock-reasons it is advantageously to design the floating particle removal device as a modular element which is depicted in FIGS. 9c, 9d, and 9e.

Figure 9D:
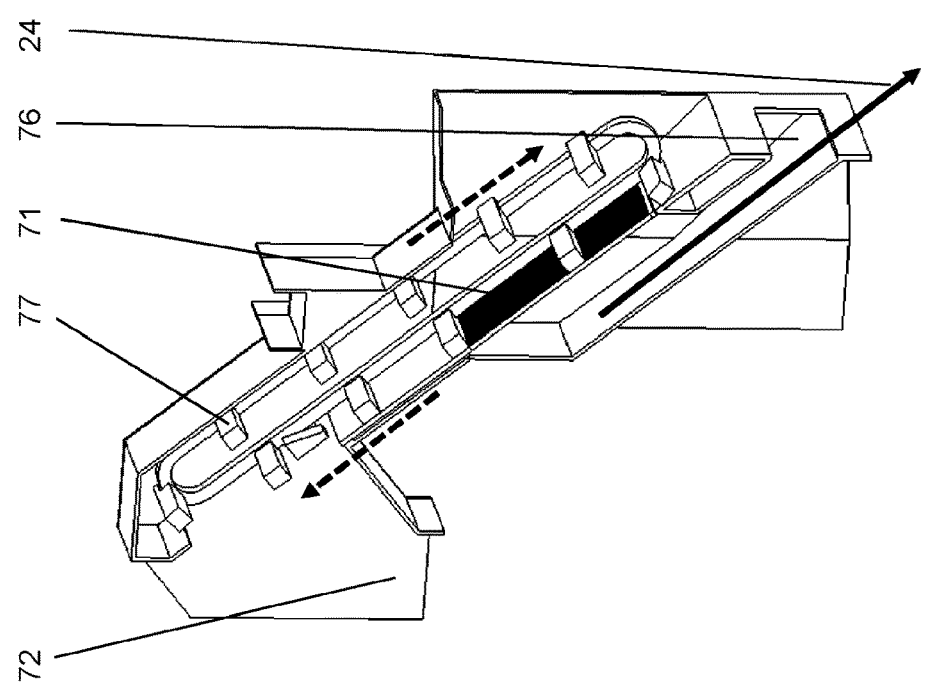
Figure 9C:
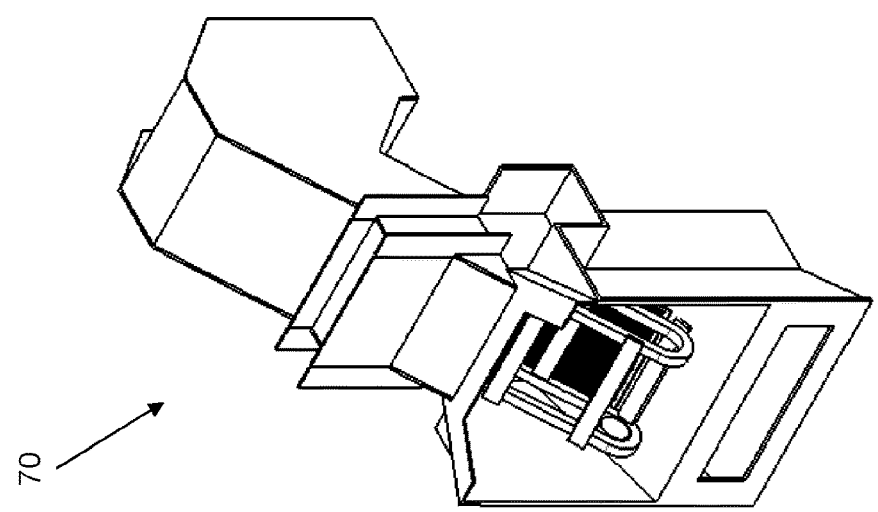

The floating particles will be guided towards a floating particle removal device 70 and specifically towards its removing means 77, in this embodiment a belt and more specifically a scraper belt as depicted in cross section FIG. 9d. The particles first pass the returning moving bars and end up at filter means 71. The hot fluid and smaller particles pass the filter means, in this embodiment slots of screen filter 71 and flow back to the fryer via hot fluid return channel 76 in the direction of hot fluid flow 24. Preferably the hot fluid flows back into the fryer close to bottom wall 16 of the vessel to prevent that slightly cooled hot fluid comes into contact with the food products. The larger particles can be removed by the moving (depicted by the dashed arrows) bars towards floating particle outlet 72. The return part of the scraper belt preferably runs back above the part which is in contact with the screen filter. For cleaning the design can be such that filter means 71 can be removed. Filter means 71 and hot fluid return channel 76 are optional.

FIGS. 10a, 10b, and 10c depict a floating particle removal device 70 similar to the embodiment of FIGS. 9b, 9c, 9d, and 9e with the difference that removing means 77 are in this embodiment a reciprocating scraper bar whose movement can be determined according to a predetermined guiding profile 74, in this embodiment determined by a cam track. Filter means 71 and hot fluid return channel 76 are optional.

Figure 11C:
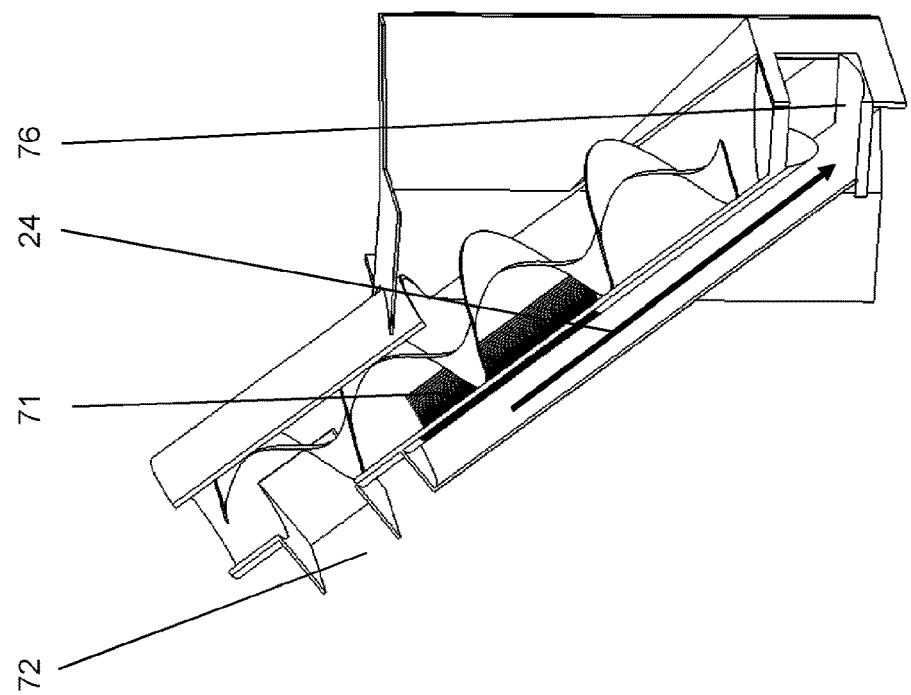
Figure 11B:
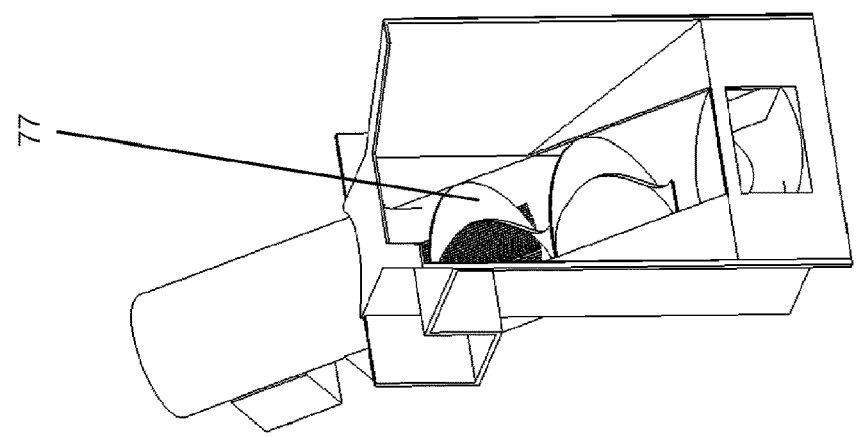
Figure 11A:
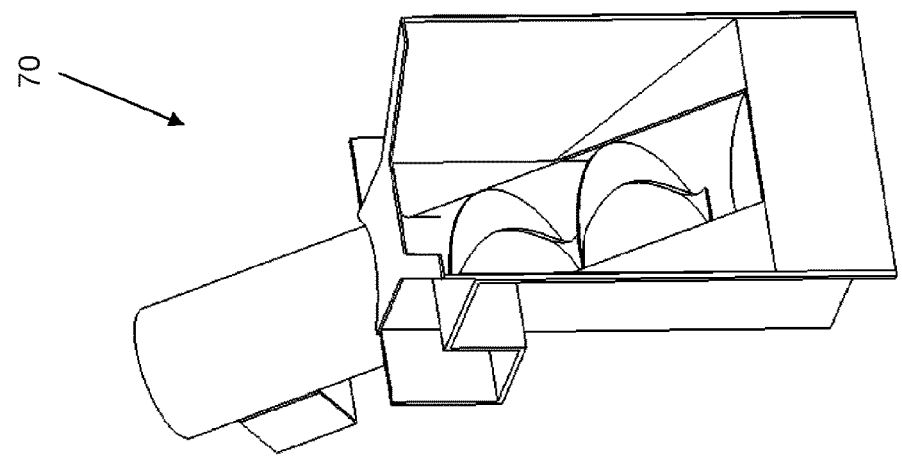

FIGS. 11a, 11b, and 11c depict a floating particle removal device 70 wherein floating particle removal means 77 are an auger which rotates to remove the floating particles towards floating particle outlet 72. Device 70 is preferably not provided with filter means 71 and preferably not provided with hot fluid return channel 76 resulting in a simple and cost effective design.

In case the floating particles flow is not sufficiently in the direction of removal means 77, it can be advantageously to increase the hot fluid flow within the floating particle removal device by introducing filter means 71 and hot fluid return channel 76. FIG. 11b and FIG. 11c depicts a floating particle removal device 70 with filter means 71 and with hot fluid return channel 76 and similar to the embodiment of FIGS. 9b, 9c, 9d, and 9e and FIGS. 10a, 10b, and 10c with the difference that the removal means will be an auger.

In state of the art, fryers, depending on the length of the fryer and/or the amount of sediment to expect, cross dirt removal device 33 can be provided as depicted in FIG. 1a and FIG. 5a. The location of cross dirt removal device 33 can be relatively close to food product-entry side 8 and at least after the location where excessive separation of particles of the food products within the fryer takes place. Removing the sediment relatively soon after separation of food particles will prevent/postpone degradation of hot fluid. Separated heavy non-floating particles 28 will sink to the bottom wall 16 of the fryer and will be moved in the direction of sediment outlet 31 by sediment removal means 30. At the location of cross dirt removal device 33 the bottom wall of the fryer can be provided with a recess/sink to collect sediment. Cross dirt removal means 34 may comprise a scraper belt which removes sediment which can be collected in the recess/sink in the bottom wall 16 of fryer vessel 11. In state of the art fryers sidewall 13 and/or 14 of the fryer is closed except at the recessed bottom wall/sink to able the cross dirt removal means 34 to pass the sidewall 13 and/or 14 of the vessel.

In a preferred embodiment of the invention depicted in FIGS. 12a, 12b, and 12c a combination of a cross dirt removal device 33 and a floating particle removal device 70 can be designed such that both sediment and floating particles will be removed with one and the same device located at preferably one sidewall 13 and/or 14 of fryer vessel 11. Non-floating particles/sediment 28 and floating particles 26 can be discharged by one and the same removal means 34/77, in the embodiment of FIGS. 12a, 12b, 12c depicted as moving scraper bars. Therefore, the sidewall 13 and/or 14, in FIGS. 12a, 12b, 12c sidewall 14, of fryer vessel 11 is preferably in communication with the hot fluid surface.

FIGS. 13a, 13b, and 13c depict a floating particle removal device 70 similar to the embodiment of FIGS. 12a, 12b, 12c with the difference that filter means 71 and hot fluid return channel 76 are provided which is advantageously in case floating particles will not flow sufficiently in the direction of floating particle removal means 77. Filter means 71 and return channel 76 will create a hot fluid flow within device 70 which will favor the floating particles towards removing means 77. Return channel 76 should be located such that hot fluid returning back to the fryer will not flush away floating particles collected on the particle removal means 77. FIG. 13a depicts return channel 76 not in communication with particle removal means 77.

Figure 14B:
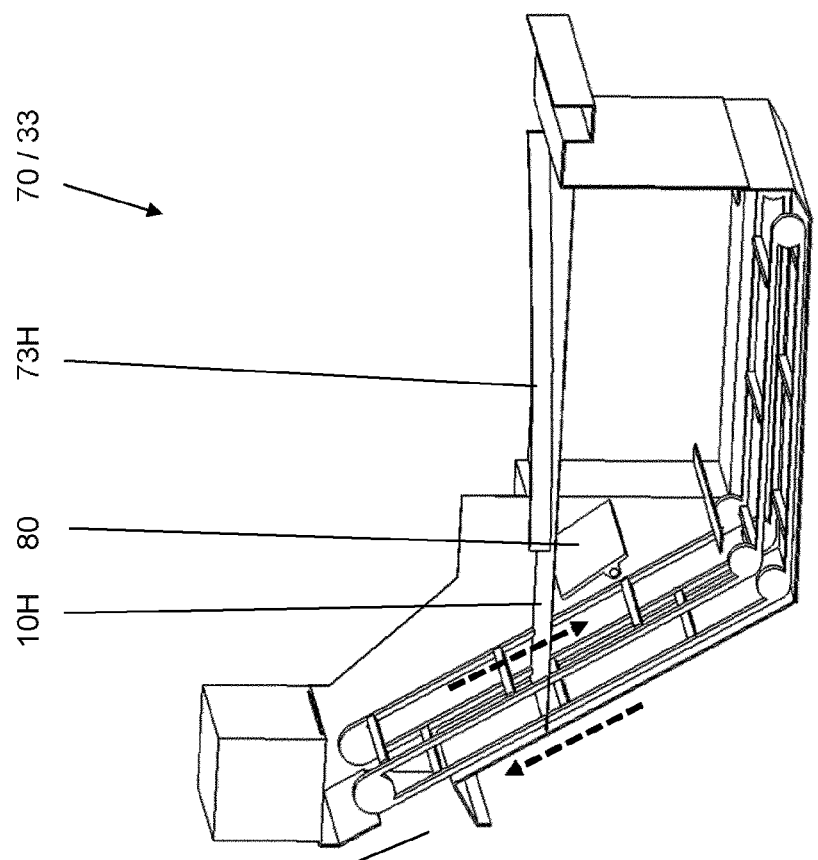
Figure 14A:
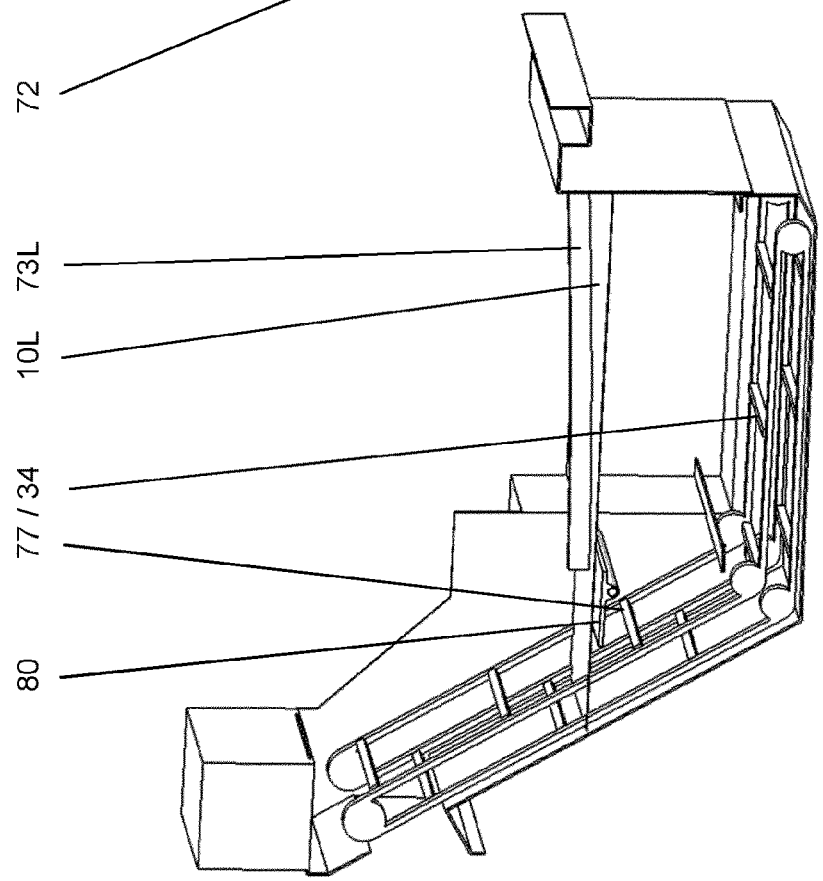

For all described embodiments a weir 80 can be applied to achieve/improve the skim of floating particles 26 from the hot fluid surface. FIGS. 14a, 14b depict an embodiment based on FIGS. 12a, 12b, 12c wherein a weir 80 will be applied to achieve/improve the skim of floating particles 26 from the hot fluid surface. FIG. 14a is directed to a fryer with a low fluid level 10L and a corresponding low position of guiding means 73L. Weir 80 is adjusted such that hot fluid/floating particles at the surface and hot fluid just below the surface can pass the weir. FIG. 14b is directed to a fryer with a high fluid level 10H and a corresponding high position of guiding means 73H. Weir 80 is adjusted such that hot fluid/floating particles at the surface and hot fluid just below the surface can pass the weir.

In a preferred embodiment weir 80 can like guiding means 73 be part of/integrated in/connected to submerge conveyor 6. FIGS. 14c, 14d, 14e depict this embodiment. In case the product thickness changes, the fluid level and the submerge conveyor can be adjusted and consequently also connected weir 80.

In case floating particle flow is not sufficient in the direction of floating particle removal device 70 and/or the removal means 77, a weir can be advantageous, when only a limited amount of hot fluid is able to move the floating particles in the direction of removal device 70 and/or removal means 77.

Figure 15B:
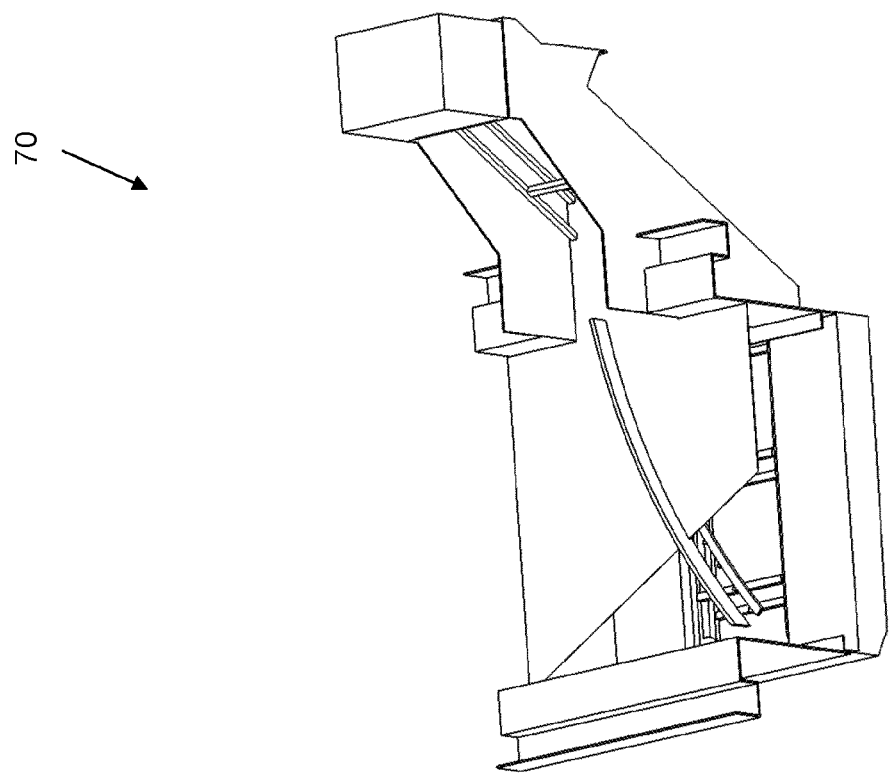
FIGS. 15a and 15b show the displacing device.
Figure 15A:
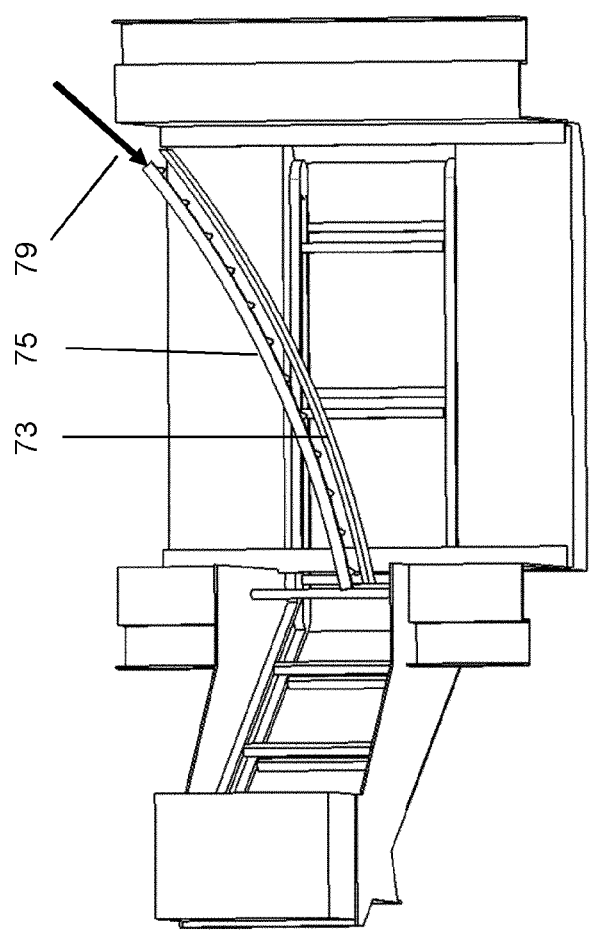

For all described embodiments the flow of floating particles towards the floating particle removal device 70 can be further improved by floating particle displacing means 75 as depicted in FIG. 15*a*. Floating particles will flow above the floating particle displacing means 75 (depict in cut out in FIG. 15*b*) and can be collected at guiding means 73. Displacing means 75 can be provided with pressurized hot fluid at hot fluid entrance 79 via pumping means, preferably via flow distributor 23 and will comprise over its length multiple apertures angled in relation to guiding means 73.

Small jets of hot fluid can be applied to direct floating particles towards floating particle removal device 70. It is preferred not to influence the hot fluid flow around the food product negatively and to prevent air swirls which can result in degradation of hot fluid. In another embodiment floating particle displacing means can be integrated within guiding means 73. The invention is not limited to the two described embodiments and to the design depicted in FIGS. 15*a*, 15*b*.

For all described embodiments vacuum means 78 can be applied to withdraw floating particles from the hot fluid surface. Vacuum means can be used instead of guiding means 73, in that case the particles will be discharged from the hot fluid surface over the width of the fryer via vacuum for instance via a vacuum connection at one or two sides of the fryer or via a vacuum over the essentially entire width of the hot fluid-bath. Vacuum means can also be used in combination with guiding means 73.

The number and locations of floating particle removal devices 70 are not limited to the embodiments previous described. Depending on the length of the fryer, multiple particle removal devices 70 and/or one or more combination(s) of one or more cross dirt removal device(s) 33 and/or one or more floating particle removal devices 70 can be utilized. In another preferred embodiment a combination of one or more cross dirt removal device(s) 33 and one or more floating particle removal device(s) 70 can be positioned at the end of the fryer.

Filter means 71 and hot fluid return channel 76 are optional for all embodiments described. Preferably due to design, manufacture, cleaning and cost reasons no filter means 71 and no hot fluid return channel 76 will be applied however mainly depending on the frying process parameters such as hot fluid flow rate and speed of the hot fluid flow it can be advantageously to increase the hot fluid flow within the floating particle removal device by introducing filter means 71 and hot fluid return channel 76 such that floating particles will be favored to flow towards removing means 77.

The invention is not limited to vessel 11 comprising hot fluid but is also applicable to vessel 11 comprising hot water or broth in order to cook food products. The invention is not limited to the use of submerge conveyor 6. In case no submerge conveyor 6 will be used floating particles 26 can be removed from the oil/water/bouillon surface by guiding means 73 and/or vacuum means 78 and/or floating particle displacing means 75. These means can be connected to for instance vessel 11 and/or non-stick conveyor 4 and/or takeover conveyor 5 and/or transit conveyor 2.

LIST OF REFERENCE SIGNS 1 fryer
2 transportation means, transit conveyor
3 transportation means, infeed conveyor
4 transportation means, non-stick conveyor
5 takeover conveyor
6 submerge conveyor
7 food product
8 food product-entry side
9 food product-exit side
10 Fluid level, hot fluid level, oil level
11 vessel, frying vessel
13 left side wall vessel
14 right side wall vessel
16 bottom wall vessel
20 water slot
23 flow distributor
24 direction hot fluid flow
26 floating particles
27 particles in suspension
28 non-floating particles, sediment
29 integrated filter means, built-in filter means, screen filter, slotted screen filter
30 sediment removal means, scraper, belt, retour belt
31 sediment outlet
32 sediment collection means
33 cross dirt removal device
34 cross dirt removal means
35 entry region
36 exit region
37 submerged section
38 surface of the transportation means on which the products are located during frying
50 hot fluid collection channel
51 hot fluid collection chamber
52 excess pressure means, positive pressure means, hot fluid pump
53 hot fluid transportation means, tube
61 heat exchanger
70 floating particles removing device
71 filter means, screen filter
72 floating particle outlet
73 guiding means
74 guiding profile
75 floating particle displacing means
76 hot fluid return channel
77 removal means floating particle removal device, auger, belt, scraper belt
78 vacuum means directed to floating particles
79 hot fluid entrance
80 weir
81 hot fluid-bath, oil bath, water-bath, broth-bath
A Transit belt 6
B Transit food product 7
C, D Transit transportation belt 3-5
H Distance fluid level 10 to bottom side guiding means 73
PD Predetermined distance fluid level above belt submerge conveyor 6

The invention claimed is:
1. A fryer with a vessel that contains a hot fluid-bath with a fluid level and which comprises:
one or more belts that transport products to be fried through the hot fluid-bath, wherein a surface of the one or more belts on which the products are located during transportation in the fryer has a submerged section that is submerged in the hot fluid-bath;

a submerge belt that hinders the products from floating to the fluid level, wherein the submerge belt has a submerged section that is submerged in the hot fluid-bath;

a floating particles removing device, that is located vertically above the submerged section of the submerge belt and/or the submerged section of the surface of the one or more belts; and a guiding device located at or near a top surface of the fluid level, the guiding device comprises a wall structure that is configured to guide floating particles that are floating at or near the top surface of the fluid level of the hot fluid-bath towards and into the floating particles removing device.

2. The fryer according to claim 1, wherein the fryer comprises an entry region, in which the submerge belt and/or the surface of the one or more belts enters into the hot fluid-bath, the fryer has an exit region in which the submerge belt and/or the surface of the one or more belts exits the hot fluid-bath, wherein the floating particles removing device is located between the entry region and the exit region.

3. The fryer according to claim 1, wherein the vessel comprises longitudinal walls, and the floating particles removing device is located adjacent to at least one of the longitudinal walls.

4. The fryer according to claim 1, wherein the wall structure of the guiding device extends at least partially over a width of the vessel of the fryer.

5. The fryer according to claim 1, wherein the wall structure of the guiding device has a concave shape, a convex shape, is straight, or a combination thereof.

6. The fryer according to claim 5, wherein the wall structure of the guiding device blocks the floating particles from flowing downstream of the guiding device.

7. The fryer according to claim 1, wherein the guiding device has a non-sticky surface.

8. The fryer according to claim 1, wherein the guiding device is part of, integrated in, and/or connected to, the submerge conveyor belt, or the guiding device is part of, integrated in, and/or connected to a transit conveyor and/or a non-stick conveyor and/or a takeover conveyor.

9. The fryer according to claim 1, wherein the fryer comprises a water slot in the vessel.

10. The fryer according to claim 1, wherein the floating particles removing device comprises mechanical means to remove floating particles from the fryer.

11. The fryer according to claim 10, wherein the mechanical means comprises an auger and/or a belt and/or a moving scraper bar and/or a reciprocating scraper bar.

12. The fryer according to claim 1, wherein a sediment removal device and the floating particles removing device are combined and located at one sidewall of the vessel.

13. The fryer according to claim 1, wherein the floating particles removing device comprises filter means and a hot fluid return channel.

14. The fryer according to claim 1, wherein the fryer comprises a weir to skim floating particles from a hot fluid surface; and/or the fryer comprises floating particle displacing means to direct the floating particles towards the floating particles removing device.

15. The fryer according to claim 1, wherein the wall structure of the guiding device extends perpendicular relative to a flow direction of the hot fluid-bath and the wall structure blocks the floating particles from flowing downstream of the guiding device.

16. The fryer according to claim 1, wherein the vessel comprises opposing longitudinal walls, the floating particles removing device is a first floating particles removing device and is located adjacent to one of the longitudinal walls, wherein a second floating particles removing device is located adjacent the other longitudinal wall of the vessel, and wherein the guiding device extends between the first floating particles removing device and the second floating particles removing device and guides the floating particles into one or both of the first and second floating particles removing devices.

17. The fryer according to claim 1, wherein the wall structure of the guiding device is only partially submerged in the hot fluid-bath and the wall structure is configured to touch and guide the floating particles towards and into the floating particles removing device.

18. The fryer according to claim 1, wherein the wall structure of the guiding device comprises a lower part that is submerged in the hot fluid-bath and an upper part that is above the top surface of the fluid level of the hot fluid-bath.

19. The fryer according to claim 1, wherein the wall structure of the guiding device comprises two curved wall portions arranged in opposition to one another, wherein the two curved wall portions extend inwardly from opposite longitudinal walls of the vessel and converge at a meeting point located in a central region of the vessel, and wherein the meeting point is arranged upstream relative to a remainder of the guide wall structure.

20. A fryer with a vessel that contains a hot fluid-bath with a fluid level and which comprises:

one or more belts that transport products to be fried through the hot fluid-bath, wherein a surface of the one or more belts on which the products are located during transportation in the fryer has a submerged section that is submerged in the hot fluid-bath;

a submerge belt that hinders the products from floating to the fluid level, wherein the submerge belt has a submerged section that is submerged in the hot fluid-bath;

a floating particles removing device, that is located vertically above the submerged section of the submerge belt and/or the submerged section of the surface of the one or more belts; and a guiding device comprising a wall structure that is configured to guide floating particles towards and into the floating particles removing device;

wherein the wall structure of the guiding device is only partially submerged in the hot fluid-bath and the wall structure is configured to touch and guide the floating particles towards and into the floating particles removing device.

* * * * *